US011970075B2

(12) United States Patent
Bhargava et al.

(10) Patent No.: US 11,970,075 B2
(45) Date of Patent: *Apr. 30, 2024

(54) OPTIMIZED CHARGING OF ELECTRIC VEHICLES OVER DISTRIBUTION GRID

(71) Applicant: Weave Grid, Inc., San Francisco, CA (US)

(72) Inventors: Apoorv Bhargava, San Francisco, CA (US); John Marshall Taggart, San Francisco, CA (US)

(73) Assignee: Weave Grid, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,314

(22) Filed: Mar. 14, 2023

(65) Prior Publication Data
US 2023/0219445 A1    Jul. 13, 2023

Related U.S. Application Data

(63) Continuation of application No. 16/925,167, filed on Jul. 9, 2020, now Pat. No. 11,642,977.

(51) Int. Cl.
*B60L 53/63* (2019.01)
*B60L 53/53* (2019.01)
(Continued)

(52) U.S. Cl.
CPC .............. *B60L 53/63* (2019.02); *B60L 53/53* (2019.02); *B60L 53/62* (2019.02); *B60L 53/65* (2019.02);
(Continued)

(58) Field of Classification Search
CPC .......... B60L 53/63; B60L 53/53; B60L 53/62; B60L 53/65; B60L 53/66; B60L 53/665;
(Continued)

(56) References Cited

U.S. PATENT DOCUMENTS

| 7,693,609 | B2 | 4/2010 | Kressner et al. |
| 7,949,435 | B2 * | 5/2011 | Pollack ................... B60L 53/20 315/80 |

(Continued)

FOREIGN PATENT DOCUMENTS

| CN | 104268668 A | * | 1/2015 |
| CN | 105337324 A | * | 2/2016 |

(Continued)

OTHER PUBLICATIONS

Office Action dated Jul. 26, 2023, Australian Patent Application No. 2021306282.

(Continued)

*Primary Examiner* — Paul Dinh
(74) *Attorney, Agent, or Firm* — Vierra Magen Marcus LLP

(57) ABSTRACT

Techniques are presented for scheduling the charging of electric vehicles (EVs) that protect the resources of local low voltage distribution networks. From utilities, data on local low voltage distribution networks, such as the rating of a distribution transformer through which a group of EVs are supplied, is provided to a load manager application. Telematics information on vehicle usage is provided from the EVs, such as by way of the original equipment manufacturer. From these data, the load manager application determines schedules for charging the group of EVs through a shared low voltage distribution network so that the capabilities of the local low voltage distribution network are not exceeded while meeting the needs of the EV user. Charging schedules are then transmitted to the on-board control systems of the EVs for implementation.

22 Claims, 14 Drawing Sheets

(51) Int. Cl.

| | |
|---|---|
| *B60L 53/62* | (2019.01) |
| *B60L 53/65* | (2019.01) |
| *B60L 53/66* | (2019.01) |
| *B60L 58/13* | (2019.01) |
| *B60L 58/16* | (2019.01) |
| *B60L 58/22* | (2019.01) |
| *H04L 67/12* | (2022.01) |

(52) U.S. Cl.
CPC ............. *B60L 53/66* (2019.02); *B60L 53/665* (2019.02); *B60L 58/13* (2019.02); *B60L 58/16* (2019.02); *B60L 58/22* (2019.02); *H04L 67/12* (2013.01); *H02J 2310/48* (2020.01)

(58) Field of Classification Search
CPC .......... B60L 58/13; B60L 58/16; B60L 58/22; B60L 2240/80; B60L 53/67; B60L 2260/46; H02J 2310/48; H02J 2310/54; H02J 7/0013; H02J 3/14; Y04S 20/222; Y04S 10/126; Y04S 30/12; Y02B 70/3225; H04L 67/12; Y02T 90/167; Y02T 10/70; Y02T 10/7072; Y02T 90/12; Y02T 90/16; Y02E 60/00
USPC ......................................................... 320/150
See application file for complete search history.

(56) References Cited

U.S. PATENT DOCUMENTS

| | | | |
|---|---|---|---|
| 8,019,697 B2 | 9/2011 | Ozog | |
| 8,116,915 B2 | 2/2012 | Kempton | |
| 8,543,287 B2 | 9/2013 | Stevens et al. | |
| 8,566,046 B2 | 10/2013 | Deaver, Sr. | |
| 8,686,687 B2 | 4/2014 | Rossi | |
| 8,957,634 B2 | 2/2015 | Lo et al. | |
| 8,972,074 B2 | 3/2015 | Tyagi et al. | |
| 9,026,347 B2 | 5/2015 | Gadh et al. | |
| 9,041,349 B2 | 5/2015 | Bemmel et al. | |
| 9,106,101 B2 | 8/2015 | Senart et al. | |
| 9,260,031 B2 | 2/2016 | Ghosh et al. | |
| 9,283,862 B2 | 3/2016 | Bridges et al. | |
| 9,440,547 B2 | 9/2016 | Buia et al. | |
| 9,457,680 B2 | 10/2016 | Shinzaki et al. | |
| 9,457,682 B2 | 10/2016 | Twarog et al. | |
| 9,620,970 B2 | 4/2017 | Gadh et al. | |
| 9,796,286 B2 | 10/2017 | Atluri et al. | |
| 9,843,187 B2 | 12/2017 | Uyeki | |
| 9,849,804 B2 | 12/2017 | Shin et al. | |
| 9,855,853 B2 | 1/2018 | Cun | |
| 9,881,033 B2 | 1/2018 | Boardman et al. | |
| 9,927,778 B2* | 3/2018 | Mailloux | G05B 11/01 |
| 9,950,633 B2 | 4/2018 | Lee et al. | |
| 9,987,941 B2 | 6/2018 | Mikftakhov et al. | |
| 9,988,058 B2 | 6/2018 | Phillips | |
| 9,989,373 B2 | 6/2018 | Uyeki | |
| 10,121,158 B2 | 11/2018 | Vardhan et al. | |
| 10,169,783 B2 | 1/2019 | Khoo et al. | |
| 10,680,438 B2* | 6/2020 | Divan | H02J 3/18 |
| 10,926,659 B2 | 2/2021 | Lee et al. | |
| 10,943,310 B2* | 3/2021 | Madonna | H02J 3/008 |
| 11,036,250 B2* | 6/2021 | Yang | H02J 3/32 |
| 11,121,577 B2* | 9/2021 | de Hoog | H02J 7/342 |
| 11,165,254 B2* | 11/2021 | Bhowmik | H02S 40/32 |
| 11,251,649 B2* | 2/2022 | Livingston | H02J 3/381 |
| 11,267,362 B2* | 3/2022 | Sadeghianpourhamami | B60L 53/64 |
| 11,270,243 B1* | 3/2022 | Roy | B60L 53/67 |
| 11,527,896 B2* | 12/2022 | Kogo | H02J 7/0013 |
| 11,642,977 B2* | 5/2023 | Bhargava | B60L 53/66 |
| | | | 320/109 |
| 11,783,996 B2* | 10/2023 | Pratt | H02H 7/04 |
| | | | 700/295 |
| 2009/0091291 A1 | 4/2009 | Woody et al. | |
| 2010/0076835 A1 | 3/2010 | Silverman | |
| 2011/0016063 A1 | 1/2011 | Pollack et al. | |
| 2012/0074901 A1* | 3/2012 | Mohammed | B60L 53/11 |
| | | | 320/109 |
| 2012/0197693 A1 | 8/2012 | Karner et al. | |
| 2012/0229089 A1* | 9/2012 | Bemmel | B60L 53/63 |
| | | | 320/109 |
| 2012/0253567 A1 | 10/2012 | Levy et al. | |
| 2012/0299531 A1 | 11/2012 | Prosser et al. | |
| 2013/0026986 A1 | 1/2013 | Parthasarathy et al. | |
| 2013/0046411 A1 | 2/2013 | Al Faruque et al. | |
| 2013/0134940 A1* | 5/2013 | Tominaga | H02J 7/0071 |
| | | | 320/109 |
| 2013/0339108 A1 | 12/2013 | Ryder et al. | |
| 2014/0143002 A1* | 5/2014 | Aisu | G06Q 10/1093 |
| | | | 705/7.18 |
| 2014/0324510 A1* | 10/2014 | Vardhan | G06Q 30/0202 |
| | | | 705/7.31 |
| 2016/0026659 A1 | 1/2016 | Harley et al. | |
| 2016/0164313 A1* | 6/2016 | Ohta | H02J 7/0013 |
| | | | 700/297 |
| 2016/0185246 A1* | 6/2016 | Paul | B60L 53/65 |
| | | | 320/106 |
| 2016/0236585 A1 | 8/2016 | Miftakhov et al. | |
| 2016/0257216 A1 | 9/2016 | Al-Awami et al. | |
| 2016/0261425 A1* | 9/2016 | Horton | H04L 67/1097 |
| 2017/0005515 A1 | 1/2017 | Sanders et al. | |
| 2019/0378648 A1 | 12/2019 | Pratt et al. | |
| 2020/0023747 A1* | 1/2020 | Logvinov | B60L 53/66 |
| 2020/0282859 A1 | 9/2020 | Shin | |
| 2021/0003974 A1 | 1/2021 | Yang et al. | |
| 2022/0009372 A1 | 1/2022 | Bhargava et al. | |
| 2022/0085612 A1* | 3/2022 | Horii | B60L 53/62 |
| 2022/0089055 A1* | 3/2022 | TenHouten | H02J 7/00034 |
| 2022/0115867 A1* | 4/2022 | Ratnayake | H02J 3/0012 |
| 2022/0163990 A1* | 5/2022 | Veda | H02J 13/00 |

FOREIGN PATENT DOCUMENTS

| | | | | |
|---|---|---|---|---|
| CN | 105976068 A | * | 9/2016 | |
| CN | 106503845 A | * | 3/2017 | |
| CN | 106873508 A | * | 6/2017 | ........... G05B 19/054 |
| CN | 108891264 A | * | 11/2018 | ................ B60L 5/20 |
| CN | 110619454 A | * | 12/2019 | ............. G06N 3/126 |
| CN | 111674276 A | | 9/2020 | |
| CN | 111674276 A | * | 9/2020 | ............. B60L 53/30 |
| DE | 102013208744 A1 | * | 11/2014 | ........... B60L 11/1838 |
| DE | 102016223715 A1 | * | 5/2018 | |
| DE | 102018201060 A1 | * | 7/2019 | |
| EP | 3279839 A1 | * | 2/2018 | ........... B60L 11/1861 |
| EP | 2305510 B1 | * | 4/2022 | ............. B60L 53/11 |
| GB | 2586654 A | * | 3/2021 | ............ G01R 31/392 |
| GB | 2586654 A | | 3/2021 | |
| JP | 2006001394 A | * | 1/2006 | |
| JP | 2015162959 A | * | 9/2015 | |
| JP | 2017135816 A | * | 8/2017 | |
| JP | 2020018159 A | * | 1/2020 | ............. B60L 53/63 |
| KR | 2020003318 A | | 1/2020 | |
| KR | 20200003318 A | * | 1/2020 | |
| RU | 2550109 C2 | | 5/2015 | |
| RU | 2550109 C2 | * | 5/2015 | ............. B60L 53/14 |
| TR | 201606772 A | * | 12/2017 | |
| WO | WO-2010042550 A2 | * | 4/2010 | ............. B60L 1/003 |
| WO | WO2011/156776 A2 | | 12/2011 | |
| WO | WO-2011150247 A1 | * | 12/2011 | .......... H02J 13/0075 |
| WO | WO-2017011373 A1 | * | 1/2017 | .......... B60L 11/1838 |
| WO | WO-2018174027 A1 | * | 9/2018 | ............. B60L 53/22 |
| WO | WO2020/061525 A1 | | 3/2020 | |

OTHER PUBLICATIONS

Theodoros et al., "Demand-Side Management ICT For Dynamic Wireless EV Charging," IEEE Transactions on Industrial Elecronics, IEEE Service Center, vol. 63, No. 10, Oct. 1, 2016, pp. 6623-6630.

(56) References Cited

OTHER PUBLICATIONS

International Search Report & The Written Opinion of the International Searching Authority dated Sep. 28, 2021, International Application No. PCT/US2021/040617.
Non-final Office Action dated Sep. 1, 2021, U.S. Appl. No. 16/925,167, filed Jul. 9, 2020.
Response to Office Action dated Nov. 29, 2021, U.S. Appl. No. 16/925,167, filed Jul. 9, 2020.
Final Office Action dated Dec. 21, 2021, U.S. Appl. No. 16/925,167, filed Jul. 9, 2020.
Response to Office Action dated Mar. 16, 2022, U.S. Appl. No. 16/925,167, filed Jul. 9, 2020.
Non-final Office Action dated Apr. 14, 2022, U.S. Appl. No. 16/925,167, filed Jul. 9, 2020.
Response to Office Action dated Jul. 13, 2022, U.S. Appl. No. 16/925,167, filed Jul. 9, 2020.
Non-final Office Action dated Aug. 16, 2022, U.S. Appl. No. 16/925,167, filed Jul. 9, 2020.
Response to Office Action dated Nov. 16, 2022, U.S. Appl. No. 16/925,167, filed Jul. 9, 2020.
Final Office Action dated Nov. 30, 2022, U.S. Appl. No. 16/925,167, filed Jul. 9, 2020.
Response to Office Action dated Dec. 2, 2022, U.S. Appl. No. 16/925,167, filed Jul. 9, 2020.
Notice of Allowance dated Dec. 16, 2022, U.S. Appl. No. 16/925,167, filed Jul. 9, 2020.
English Abstract of Russian Publication No. RU2550109 published May 10, 2015.
English Abstract of Chinese Publication No. CN111674276 published Sep. 18, 2020.
English Abstract of Korean Publication No. KR2020003318 published Jan. 9, 2020.
Communication pursuant to Rule 161(1) and 162 EPC dated Feb. 23, 2023, European Patent Application No. 21749750.2.
Response to Communication pursuant to Rule 161(1) and 162 EPC dated Sep. 5, 2023, European Patent Application No. 21749750.2.
Response to Examination Report dated Dec. 4, 2023, Australian Patent Application No. 2021306282.
Examination Report dated Dec. 8, 2023, Australian Patent Application No. 2021306282.

\* cited by examiner

| Category | Attribute |
|---|---|
| Utility Service Account Information | Service Account ID<br>Service Point ID (for associated service point)<br>Rate Code<br>Service Territory<br>Active Date |
| Service Point Information | Service Point ID<br>Location: Service Address and/or latitude/longitude |

Figure 7

| Category | Input | Model |
|---|---|---|
| System (Non-EV) Load Modeling / Forecasting | • Historical household usage data<br>• Weather data | Load forecast |
| EV Load Modeling / Forecasting | • Driving behavior<br>• Daily charging demand<br>• Plug-in frequency<br>• Arrival and departure times | Vehicle charging demand forecast |
| Charging Optimization | • System non-EV load forecast<br>• EV charging demands and constraints (real and simulated) | Optimization model objectives:<br>• Satisfy customer charging requirements<br>• Local system peak reduction<br>• Total system peak reduction |

Figure 8

OPTIMIZED CHARGING OF ELECTRIC VEHICLES OVER DISTRIBUTION GRID

CLAIM OF PRIORITY

This application is a continuation application of U.S. patent application Ser. No. 16/925,167 filed Jul. 9, 2020, published as U.S. 2022/0009372 on Jan. 13, 2022, and issued as U.S. Pat. No. 11,642,977 on May 9, 2023, by Bhargava et al., entitled "OPTIMIZED CHARGING OF ELECTRIC VEHICLES OVER DISTRIBUTION GRID," incorporated by reference herein in its entirety.

BACKGROUND

Electrical power is provided from generation sources over transmission lines to substations, where the voltage levels are stepped down and the electricity supplied to customers over localized distribution networks. In a typical low voltage local distribution network, multiple customers are supplied from a single transformer. Such transformers will commonly have a maximum amount of power or current that they can provide before they degrade or fail. Consequently, if multiple customers commonly supplied from a single transformer all draw large amounts of power at the same time, the transformer can be damaged or fail. With the increased popularity of electric vehicles (EVs), such a situation is becoming increasing common as the recharging of EVs draws relatively large amounts of power and customers will often charge their EVs at nighttime when they return home. This can place the local distribution network supplying these vehicles under excessive strain.

BRIEF DESCRIPTION OF THE DRAWING

Like-numbered elements refer to common components in the different figures.

FIG. 7 is a table illustrating examples of service account data that can be provided from a utility to the load manager.

FIG. 8 is a table to illustrate components that can be used in embodiments of algorithms for the load manager's control software to schedule charging to minimize stress on constrained system components such as transformers, while enabling overall higher asset utilization.

DETAILED DESCRIPTION

The following presents techniques for scheduling the charging of electric vehicles (EVs) that protect the resources of local low voltage distribution networks. Data on the local low voltage distribution networks, such as the rating of a distribution transformer through which a group of EVs are supplied, is provided from utilities to a load manager application. Telematics information on vehicle usage is provided from the EVs, such as by way of the original equipment manufacturers for the EVs. From the telematics data and the data from the utilities, the load manager application determines schedules for charging a group of EVs through a shared low voltage distribution network so that the capabilities of the local low voltage distribution network are not exceeded while meeting the needs of the EV users. Charging schedules are then transmitted to the on-board control systems of the EVs.

Figure 1:
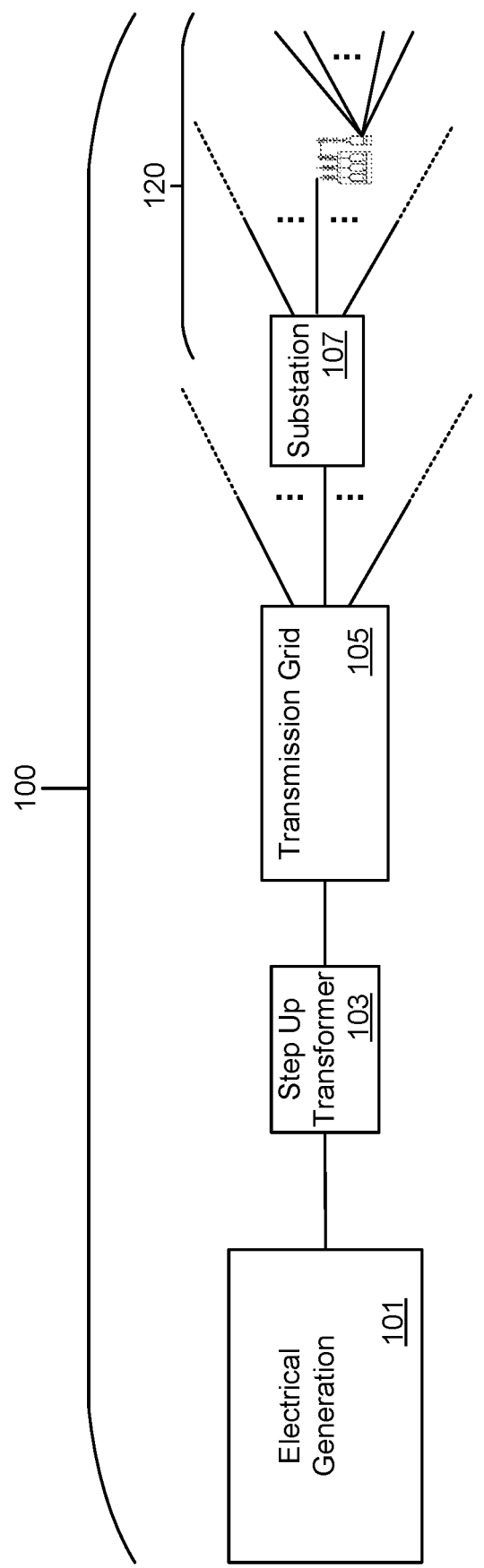
FIG. 1 is a high-level diagram of an electric power distribution system.

FIG. 1 is a high-level diagram of an electric power distribution system for a power grid 100. At the electrical generation block 101, one or more power plants or other generation sources generate the electricity. The electrical generation sources can include large scale power plants, such as gas or coal fired power plants, nuclear power plants, wind or solar power generator, hydro-electric power generation, or other forms of power plants. An electrical grid will typically include a number of such power plants. The electricity will be distributed to customers over a transmission grid 105 formed of transmission lines that can carry the electricity over long distances. The transmission lines typically carry the electricity as high or very high voltage alternating current (AC). Such transmission lines commonly carry voltage levels of hundreds of kilovolts. The electricity from a power plant 101 will often be supplied to the transmission grid 105 by way of step up transformer 103 that steps up the voltage to the high-voltage levels used by the transmission grid.

To supply customers, the high-voltages levels (~100s kV) on the transmission lines are received at substations 107, where the voltage is stepped down to the low voltage range of hundreds to a few thousand volts. The stepped down voltage is supplied to a local, low-voltage distribution network 120 serving customers. The distribution lines carry the electricity to distribution transforms that will usually supply a number of customs and further steps-down the voltage to the levels used by the end customer, usually in the 100-200 volt range.

Figure 2:
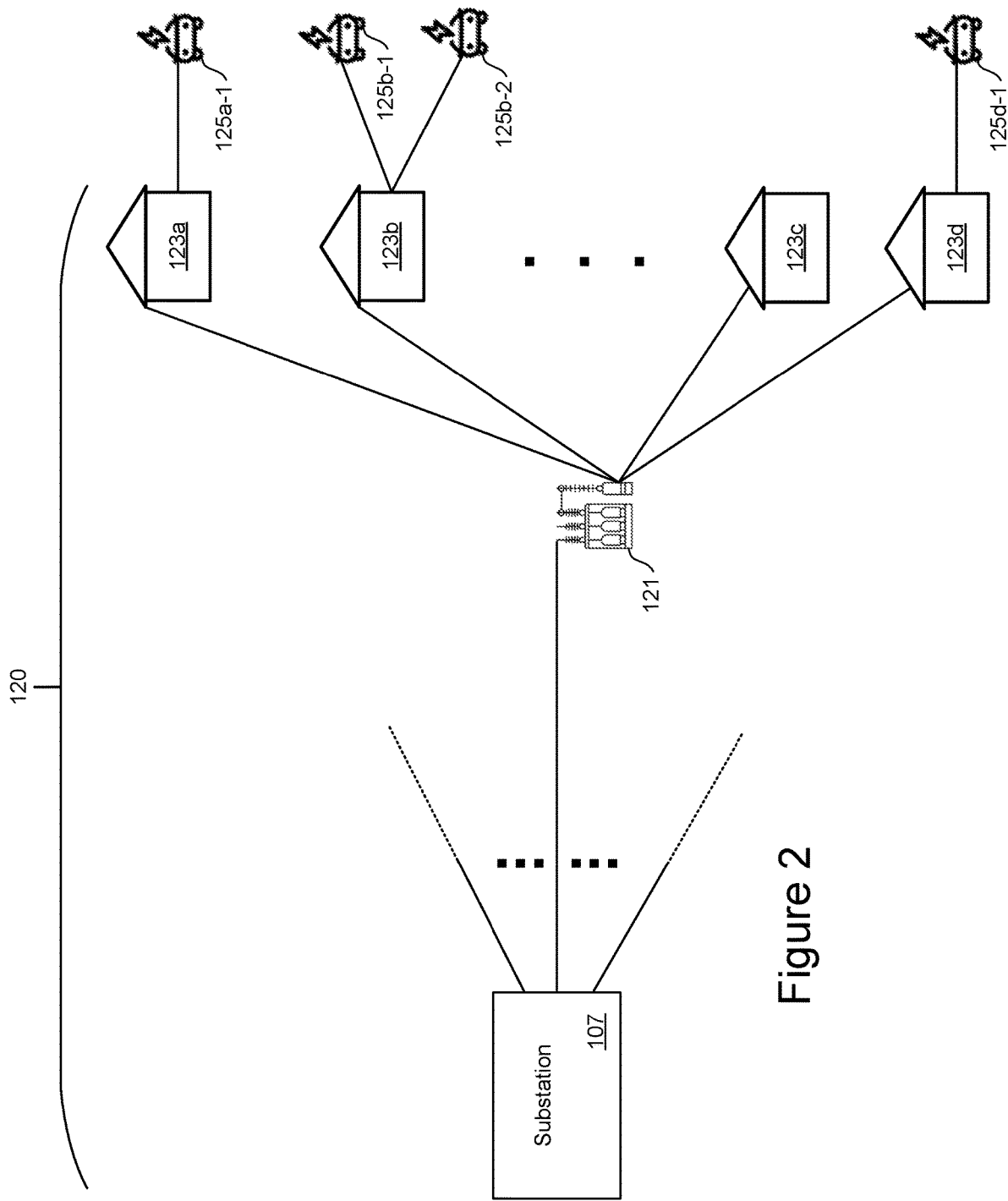
FIG. 2 shows an example of a low voltage distribution network serving multiple customers at which electric vehicles (EVs) are charged.

FIG. 2 shows an example of a low voltage distribution network 120 serving multiple customers at which electric vehicles (EVs) are regularly charged. After the voltage level is stepped down to the distribution voltage level at a substation 107, it is supplied to the local distribution network at a voltage less than used on the transmission grid, but usually higher than used by the customer. For example, typical residential customer will use voltages in the 100-240V ranges, while the substation supplies the distribution network 120 at voltages in the range of several thousand voltages. The specifics of the distribution can vary with respect to region and with respect to individual topologies and components of a given distribution network within a region. Generally, the network will have one or more main branches that will in turn branch several more times. For supplying customers from these branches, distribution transformers 121 will step the voltage down to the level or levels used at the customer level, here the four residences 123*a*, 123*b*, 123*c*, and 123*d*, but, more generally, the number can range one to many more . In a common residential setting, the distribution transfer will commonly be a pole mounted transformer that feeds a group of houses.

All of the electricity provided to the group of houses (or other set of customers) 123*a*, 123*b*, 123*c*, and 123*d* is provided through the single transformer 121. Distribution transformers have ratings specifying the amount of electricity that they can provide without damage, where distribution transformers normally have ratings less than 200 kVA, where a volt-ampere (VA) is the unit used for the apparent power that a transformer can safely provide. If a distribution transformer is supplying at a level that exceeds this rating, it may degrade or fail. In some cases, a distribution transformer can handle an among of power exceeding the specified rating by some amount for a short time, but repeated or extended calls on a transfer to exceed its nominal specified rating will eventually lead a transformed to degrade or fail. Distribution transformers may also degrade over time even when operated within the nominal rating specification, so that the actual maximum apparent power that can safely be provided through a distribution transform be less than specified. The following discussion will mainly focus on the distribution transformers, but other upstream elements of the distribution network 120, such as feeders and substations, can also be taken into account in the determination of the EV charging schedules.

A local distribution network is typically laid out so the that maximum expected power drawn by a group of houses or other customers is within the corresponding distribution transformer's rating, usually with some amount of headroom to avoid overtaxing the distribution transformer. However, these determinations have often been made quite some time in the past based on expected loads. As equipment ages and degrades, and customers often add on additional electronic appliances and other equipment, the overhead margin can diminish and the demands on a distribution transformed may be near or exceeding its rating. The introduction of electric vehicles, or EVs, has aggravated this situation.

The amount of power drawn by an electrical vehicle while being charged can be significant. The owner of an electric vehicle will typically do most, if not all, of the charging for the EV at home. The amount of power drawn by an EV being charged will often be more than the combined power drawn by all other electronic power drawn by the residence. FIG. 2 illustrates the situation where the shown residences have several EV, EV 125*a*-1 at 123*a*, 125*b*-1 and 125*b*-2 at 123*b*, and 125*d*-1 at 123*d*. A common time for charging an EV is when the owner returns home in the evening, staring the process before going to bed for the night. If each of these EVs in FIG. 2 is charging concurrently, the amount of power being drawn can quite easily exceed the rating of the distribution transformer, perhaps significantly so.

It should be noted that this problem is concentrated in the final portions the distribution grid, at the distribution transformer 121 and other elements of the local distribution network 120. Since this spiking due to EV changing will typically occur at night, when industrial and commercial power demand is low, the power provided from the electrical generation block 101 and the capabilities in power generation block 101 and the transmission grid 105 up to the substations 107 may be more than up to the requirements, but the distribution network 120, and the distribution transformers 121 in particular, cannot meet the demand. With the increased usage of EVs, it is the distribution grid where rapid evolution of needs is happening, segment of the power distribution system that is the most aged and has the least visibility.

Figure 3:
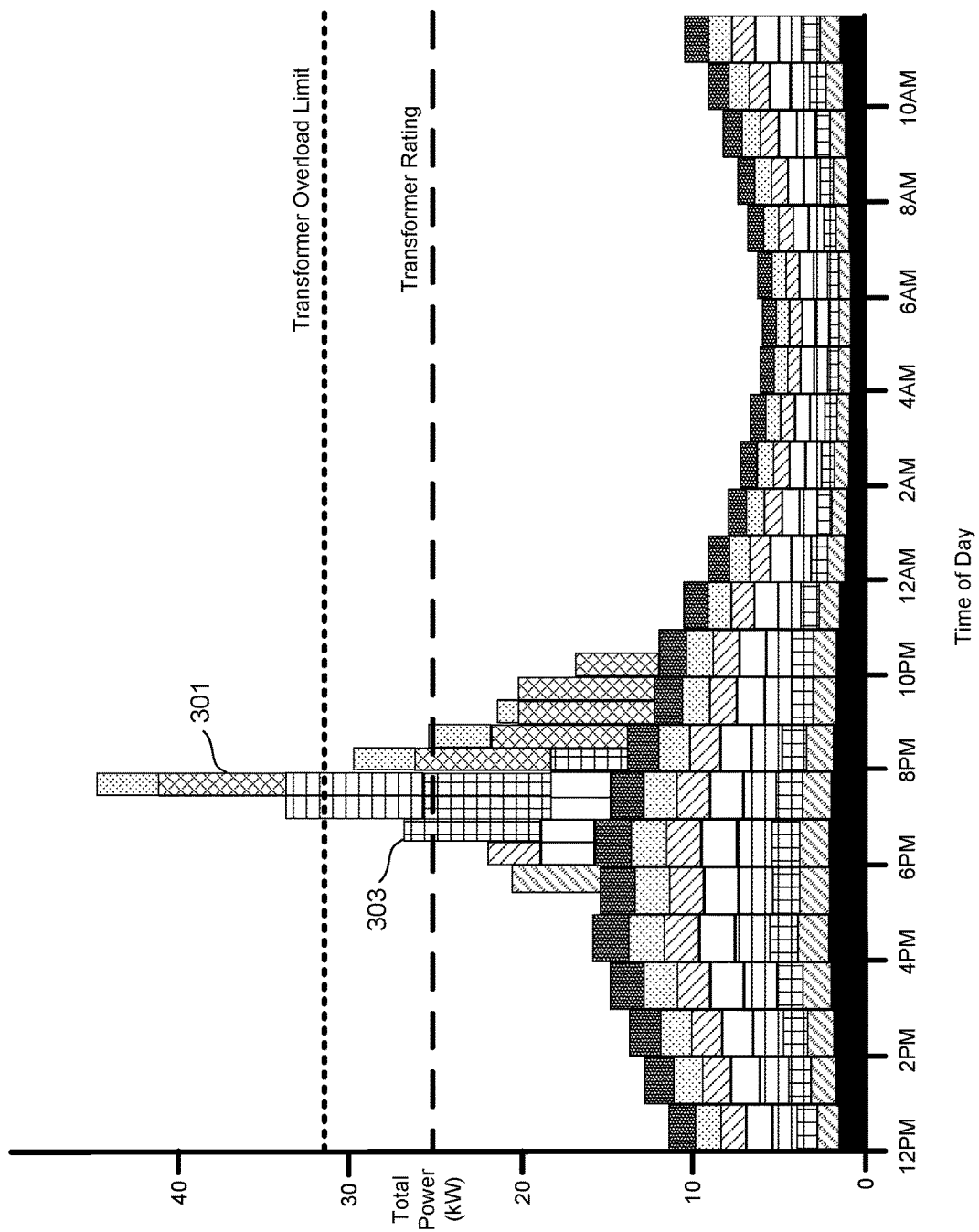
FIG. 3 is graph of time of day versus power for a set of homes sharing a common distribution transformer and where a number of EVs are charged in an uncoordinated manner.

FIG. 3 is graph of time of day versus power for a set of homes sharing a common distribution transformer and where a number of EVs are charged in an uncoordinated manner. In the example of FIG. 3, the power consumption of a set of seven houses from noon of one day to noon of the following day is shown on an hour by hour basis. The curving lines along the bottom represent examples of typical usages in kilowatts (kW) of the set of houses without the inclusion of EV charging.

Also on the graph of FIG. 3 is marked the rating for the distribution transformer, which is set at 25 kVA in this example and which is a fairly typical value. The rating represents the level for which a transfer is designed to operate for an extended period. Also shown is an overload limit for the distribution transformer, which is a higher value (32 kVA in this example) that a distribution transformer may be able sustain for brief intervals. Exceeding these limits can cause the distribution network to degrade or fail at once. For example, a particularly large spike could lead to a catastrophic failure. A lower spike, while not leading to a sudden failure, might cause the transformer oil or other insulating liquid to boil, degrading the transformer. As shown in FIG. 3, the combined, non-EV usage of the set of residences is well within the distribution transformer's rating; however, in many cases the actual rating of a transformer may not be known, either through lack of records or device aging.

FIG. 3 also shows the addition electrical use for the set of houses when several of the houses charge one or more EVs. In a typical usage model, as an owner returns home in the evening, they will plug in their EV to charge for several hours. The amount of power drawn, and the time for charging, will vary depending on the vehicle and its battery charge. Usually, charging will take several hours and the power drawn by a single EV will often exceed the total power used by the combined usage of the rest of the residence. Consequently, as the owners return home and begin charging their EVs, the total power being drawn can readily exceed the distribution transformer's rating and overload limit. As EVs become increasingly common, this situation will only worsen.

Figure 4:
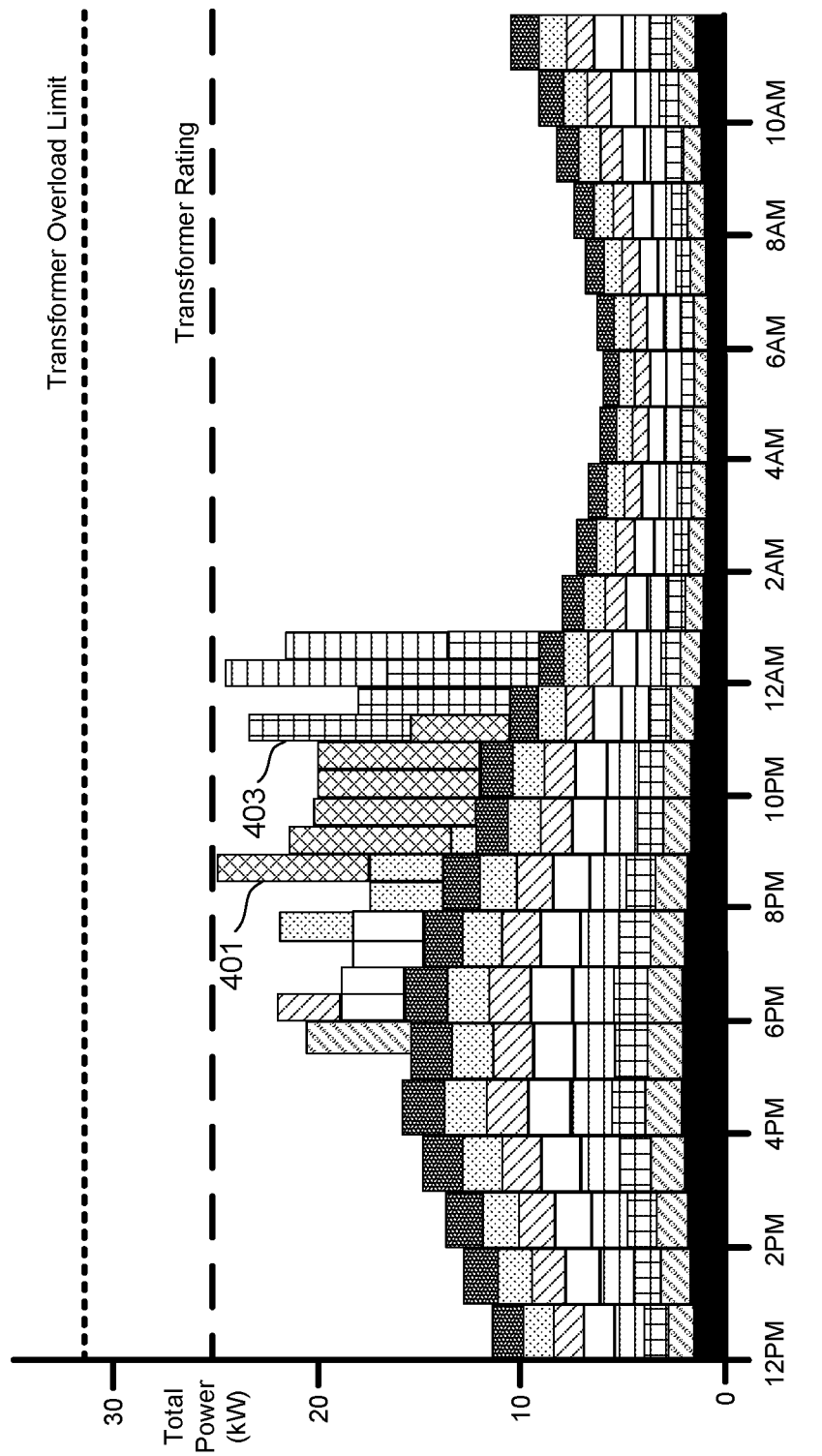
FIG. 4 is graph of time of day versus power for a set of homes sharing a common distribution transformer and where a number of EVs are charged in a coordinated manner.

To avoid this situation, the following presents techniques to optimize the charging of electrical vehicle over a distribution grid so as to keep the demands on the distribution grid within its limitations. As described in more detail in the following discussion, information on the customers' power usage, details of the distribution network (such network topology and equipment specifics), information on vehicle usage (such as battery state and vehicle usage from telemetry data), and other factors can be used to instruct the EVs on scheduling and coordination of their charging. FIG. 4 illustrates the result of a such a coordinated charging.

FIG. 4 is graph of time of day versus power for a set of homes sharing a common distribution transformer and where a number of EVs are charged in a coordinated manner. FIG. 4 repeats the elements of FIG. 3, but now the charging of the EVs are coordinated so that the combined total power remains within the distribution transformer's rating. For any EVs that charge through the common distribution transformer, but are not registered with the load manager, their usage will be included with the base line usage. Although the EV may be hooked up for charging at the same time as for FIG. 3, based on the instructions received at the EV, an EV may delay its charging or charge at a lower rate. For example, rather than the EV indicated at 301 staring at 6:30 PM as indicated in FIG. 3, the charging in delayed to 8:30 PM as indicated at 401 of FIG. 4, so that when it is added in to the total drawn on the distribution transformer will be within its rating. Similarly, although the EV whose charging is indicated at 303 of FIG. 3 may still be connected for charging at 7:30 PM, it will delay its charging until 11:00 as indicated at 403 of FIG. 4. As illustrated in FIG. 4, this results in no overload time and, in particular, no extended overload.

In addition to considering peaking issues at the local distribution network, larger system level power network consideration can also be incorporated. For example, power networks may introduce time of use (TOC) pricing, introducing time of use discounting where rates are reduced during times when the total power consumption of the electric grid is lower. For example, late at night industrial and commercial usage will typically be lower. To have a more uniform demand on the power plants of the electrical generation block 101, discounts may be often to residential customers to incentivize late night usage.

Figure 5:
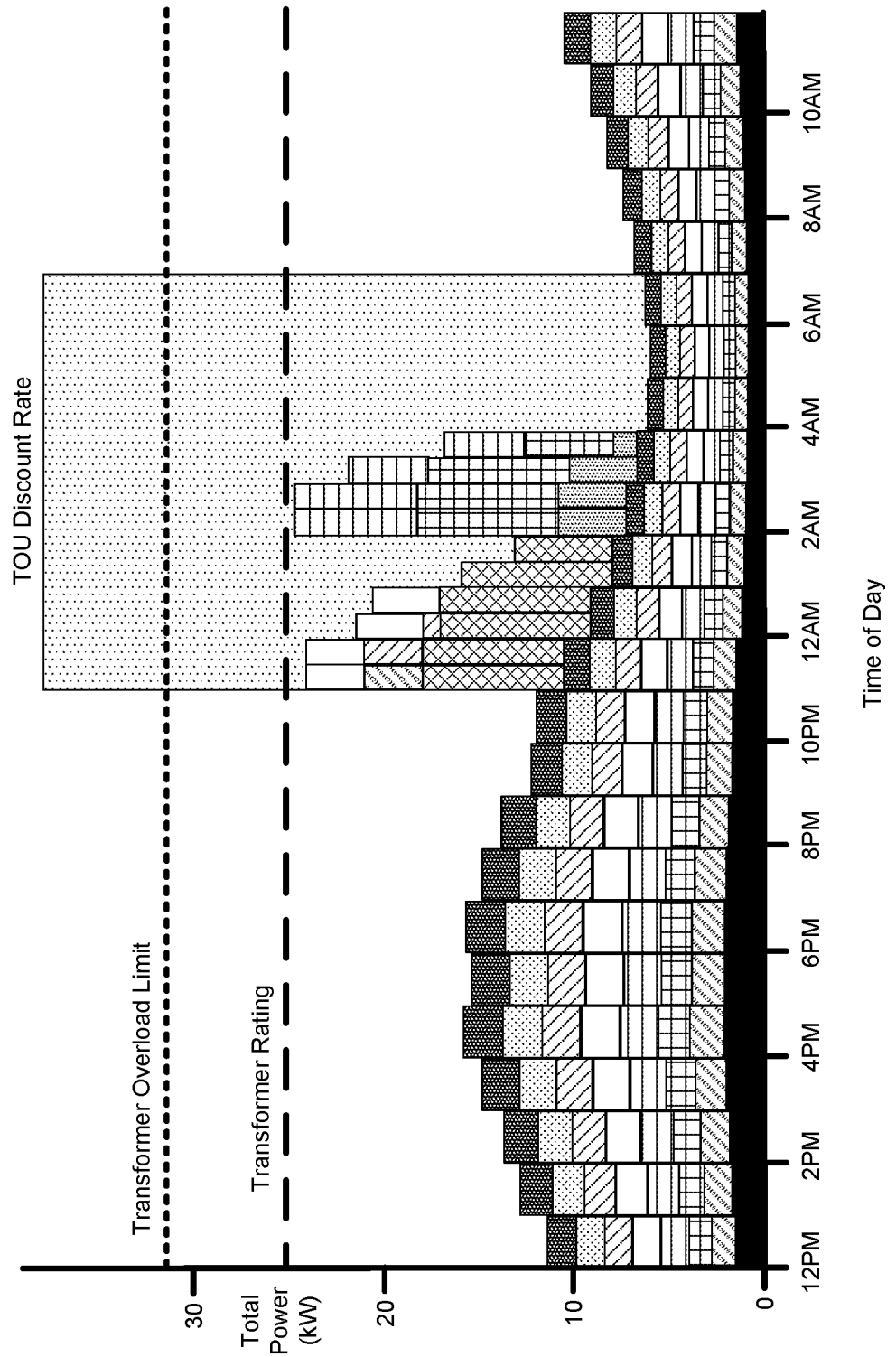
FIG. 5 is graph of time of day versus power for a set of homes sharing a common distribution transformer and where a number of EVs are charged in a coordinated manner that takes advantage of time of use discount rates.

FIG. 5 is graph of time of day versus power for a set of homes sharing a common distribution transformer and where a number of EVs are charged in a coordinated manner that takes advantage of time of use discount rates. As illustrated in FIG. 5, all of the EVs delay their charging until the period of the TOU discount rate. The EVs can again be instructed to coordinate their charging to avoid overloading the local distribution transformer, but the arrangement of the charging times may differ relative to FIG. 4 as the other usage of the residences is reduced at these hours.

Figure 6:
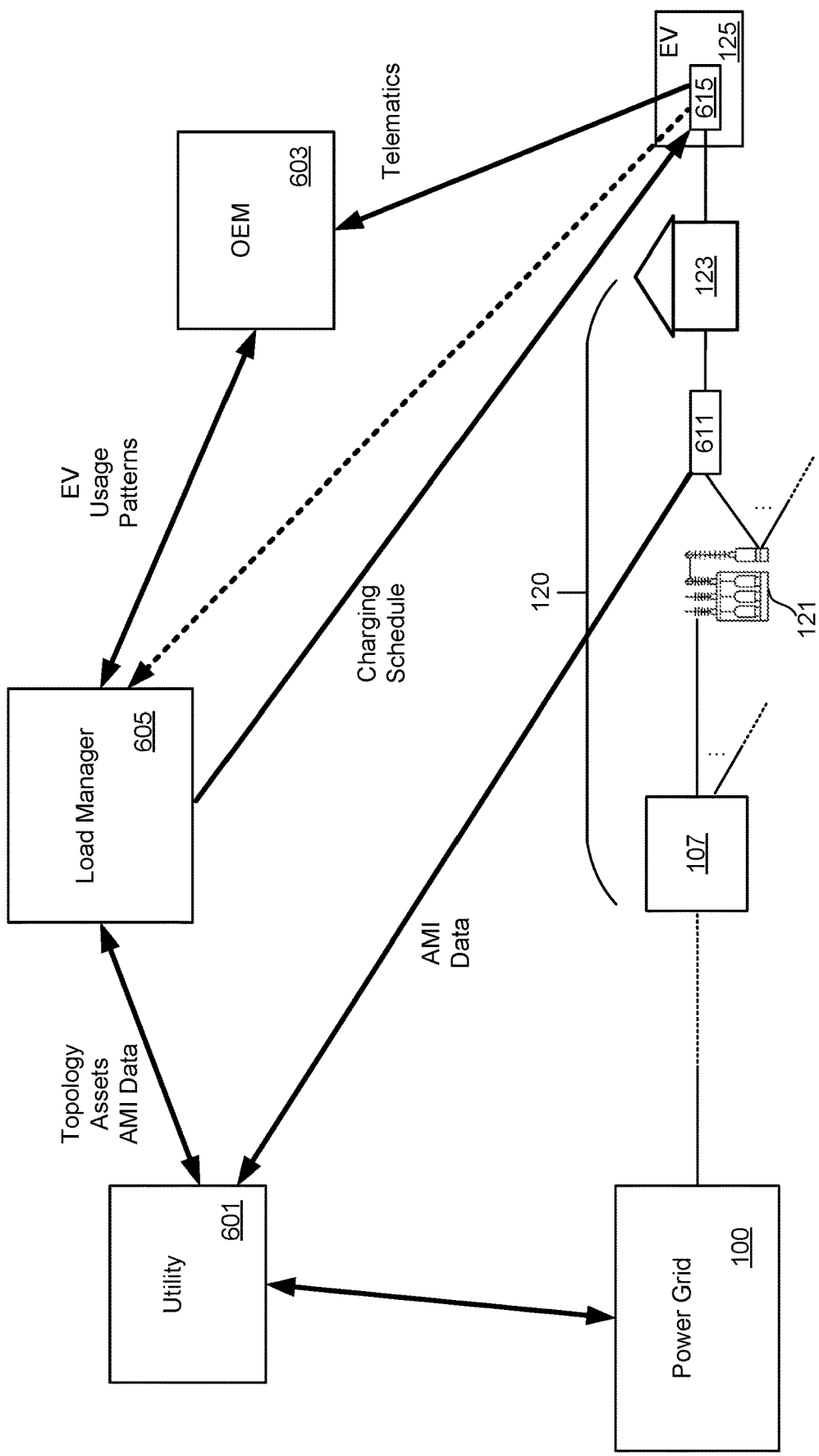
FIG. 6 is a high-level representation of some of the elements that can go into one embodiment for the optimizing of the charging of EVs over distribution networks.

FIG. 6 is a high-level representation of some of the elements that can go into one embodiment for the optimizing of the charging of EVs over distribution networks. As in FIGS. 1 and 2, a power grid 100 supplies a residence or other customer 123 and which an EV 125 is charged, where only a single representative customer and EV is shown. Of the power grid 100, only one substation 107 and one distribution transformer 121 are explicitly shown. The power grid 100 is operated by one or more distribution utilities or other power providing entity, represented as utility 601. The utility 601 will have information on the power grid 100, including information such as the power grid's topology and of the assets forming the grid. For example, the utility will commonly have information on the local distribution grids such as the number of customers (such as 123) connected to a given distribution transformer 121, along with the rating and other information on the distribution transformer 121 and other elements of the local distribution grid 120, although this information may not be current. The customer 123 will often have its usage monitored by a smart meter 611 (Advanced Metering Infrastructure, or AMI), where this information is periodically sent to the utility 601. (The other customers of FIG. 2 can similarly have a corresponding smart meter.) The AMI will commonly contain not just total usage, but usage as a function of time, since rates may be time dependent such as for given time of use discounting. Consequently, the utility 601 will often have relatively detailed information on usage patterns of individual customers.

An EV 125 will include have on-board control systems 615 that monitor telematics for the EV. These telematics can vary from one EV original equipment manufacturer (OEM) to another, and from model to model of the same manufacturer (for example, a truck may track different telematics than a personal automobile), but will include information such as battery charge state, usage and location information. In addition to using these data for monitoring and controlling the EVs' operation, the telematics can be used to extract usage patterns. These telematics can be, and typically are, provided to an EV' s OEM 603, and these telematics can be used to extract these usage patterns.

Based on the information form the utility 601 on the power grid 100, and in particular on the local distribution grid 120 with the customer 123 at which the EV 125 is charged, and the telematics derived information from OEM 603 on the EV 125, a load manager 605 can determine an optimized charging control to coordinate the charging of EV 125 and other EVs that charge through the distribution transformer 121. The charging control data can schedule the charging of the EVs as illustrated in FIG. 4 or 5, in a manner the takes into account both the properties of the local distribution network 120 and the usage pattens of the individual EVs, such as 125, that use the local distribution network 120. The discussion here focuses on the distribution transformer, but some embodiments can also incorporate information on upstream elements of the local distribution network 120 such as power ratings or other data on substation 107 and feeders in the distribution network. The charging control can then be transmitted to the on-board control systems, such as 615, that then charge the EVs according to the schedule. This information can be provided to the EV by, for example, a Wi-Fi connection or via its on-board (3G or 4G) antenna. Depending on the embodiment, the charging schedule can be sent by way of the EV's OEM 603 or directly from the load manager 605, such as by an internet connection to the customer's Wi-Fi. Similarly, the telematics can alternately or additionally be provided to the load management system without going by way of the EV's OEM 603 in some embodiments. In this way, the EV receives its charging schedule, independently of any charging apparatus, such as a charging station, that the customer would be using at the home to supply the EV. Charging schedules and other information from the load manager 605 can also be provided to the utility 601 for use in managing of the power grid 100 and to EV OEMs for use in EV development.

In addition to determining scheduling for the EVs, the embodiments presented here for the load manager 605 can also provide advanced capabilities for electric utilities 601 to both better understand electric vehicle charging behavior and implement reliable and cost-effective residential load management programs. The load manager 605 can connect directly to vehicle telematics units by integrating with EV OEM 603 existing cloud data infrastructure to both collect data and send charging control information back to the vehicle. This direct approach can provide utilities 601 a high level of data accuracy, providing EV users with a charging schedule that minimizes interference with drivers' use of their EVs, whilst ensuring that the utility's 601 distribution network 120 is not overloaded.

Embodiments presented here can avoid the need for customers to install and set up external hardware equipment, such as Wi-Fi-enabled electric vehicle supply equipment (EVSE) or vehicle on-board diagnostic (OBD) devices. The approach described with respect to FIG. 6 can be a cloud-based setup that reduces program complexity, improves the customer experience, and increases compliance rates for participants while avoiding the need for costly individual service actions. It also allows customers flexibility, as it is brand and device agnostic, equally permitting use of hard-wired EVSE, NEMA (National Electrical Manufacturers Association) plug-based EVSE, or manufacturer-included mobile connector for home charging.

The approach illustrated with respect to FIG. 6 can also generate clearer insights into EV usage. Off-board connected EVSE for residential use generally do not have the ability to observe vehicle state of charge, which is important both for understanding driver charging behavior and for balancing driver and utility objectives under any load management protocol.

The access of the load manager 605 to direct measurement information from an EV's on-board control systems 615 also provides greater individualized granularity and precision than disaggregation-based approaches. Disaggregation relies only on whole-home level load data from AMI as measured by the smart meter 611-a. In the approach presented here, the charging load is directly measured through the onboard vehicle controls rather than approximated from changes in the bulk data. Since this method is vehicle-based, rather than location-based, collected data provides the utility 601 with more accurate information on both home and public charging behavior and EV needs. The on-board diagnostics of the EV's on-board control systems 615 can fill in the gaps on battery and location data that would otherwise be difficult to compile and would require the introduction of addition hardware on a customer's charging apparatus.

During customer onboarding, the load manager 605 can receive permission to access vehicle data through the EV's OEM 603 as connected to vehicle platform 125. Information on vehicle type, make, model and year is supplied from the vehicle's EV telematics or through information embedded in the Vehicle Identification Number (VIN). This data is linked to the utility service account and service point, with geofencing used to verify charging location. Service point interval meter data from the utility 601 may be used in some embodiments, when available, for measurement and verification purposes. Information on distribution system network structure and asset inventory from the utility 601 can be shared with the load manager 605 to improve on default demand response and support distribution system awareness and integrated local charging schedule optimization.

Considering the data from the EV, vehicle telematics data can be collected directly from the EV's onboard telematics system of the on-board control systems 615. The load manager 605 can access to this data through an application programming interface (API), requiring username and password authentication by the vehicle owner. While APIs can vary by manufacturer and model, these generally provide sufficient data for optimizing charging schedules. This data can be collected via real- or near real-time pull requests for specific information at regular intervals, sent to the vehicle telematics unit, or alternately through bulk data downloads, depending on the embodiment. Decisions around frequency and method depend on both specific vehicle model capabilities and program requirements.

Among the data fields that can be provided by the EV's onboard telematics system of the on-board control systems 615 can include:
   Vehicle location (latitude/longitude);
   Battery state of charge;
   Plug-in status;
   Charging status; and
   Odometer.

Additional endpoints (e.g. grid voltage and charging current) may be available depending on vehicle model capabilities, which contribute further detail.

These received data can be used to generate and infer additional event information, including EV charging events, that can include:
   Location of charge event (latitude and longitude);
   Date and time of charge event start/end;
   Battery state of charge start/end; and
   Number of kWh consumed in each charge event.

It should be noted that the load manager 605 is not interested in tracking individual trips or maintaining records of participant location, except where needed to support program objectives or assess compliance. As location data contains sensitive personal information, the load manager can place appropriate internal restrictions on access to individual location data and ensure all use of location data is narrowly focused on satisfying the residential charging program objectives.

During the load management phase of EVs' load management, the load manager 605 can send charging commands directly to a vehicle. These commands vary, depending on system capabilities and embodiment, but can include:
   Scheduled vehicle charging, using set times when the vehicle is allowed to charge while plugged in, thus preventing charging during the times outside of the charging schedule, even if the vehicle is plugged in;
   Setting a "charge-by" time, which sets the vehicle's charging start time such that the EV battery reaches full charge by the charge-by time;
   Real-time signals to start and stop charging, sending push requests to vehicles which initiate or halt active charging; and
   Real-time signals to modify charging rate, sending push requests to alter the charging amperage in order to dynamically control charging power at intermediate levels.

These capabilities can be used by load manager 605 to manage charging under specified demand response events, and subsequently for daily charge scheduling in coordination with utility load management objectives and distribution system constraints.

Considering now the data provided from the utility 601 to the load manager 605, various categories of information possessed by utility 601 can be shared with load manager 605. This data can be grouped into four categories:
   Service account data;
   Demand response events;
   Smart meter data (AMI); and
   Distribution system information.

Service account information can be used to link a customer's EV and utility accounts together, determine valid home charging locations, and conduct measurement and verification. The utility 601 can convey demand response events to load manager 605. Smart meter data can be used for verifying EV load measurements and reductions through an independent monitoring channel, and to enable more comprehensive analysis and additional system context. Distribution network information, including relational and asset data, can be used to support advanced system awareness tools and associated load management strategies.

FIG. 7 is a table illustrating examples of service account data that can be provided from a utility 601 to the load manager 605. Service account and service point information can be used to verify customer eligibility and program compliance, and to connect vehicle and utility accounts. The utility service account information can include: service account ID; service point ID (for associated service point); rate code; service territory; and active date. The service point information can include a service point ID and location information, such as a service address, latitude/longitude, or both. The location information can be used to link reported charging activity (from car data) with the registered location of charging, ensuring that charging occurs at a home location according the program, and thus ensuring program compliance.

In some embodiments, the load manager 605 can implement the capability to respond to demand response (DR) events generated by the utility 601 that indicate periods during which EV charging cannot occur, by communicating directly with vehicles to carry out utility requirements. DR events can be received from a utility 601 in formats that can include simple email notification or more elaborate protocols such as an Open Automated Demand Response (OpenADR), depending on the embodiment. In the OpenADR case, the load manager 605 could deploy a custom Virtual End Node (VEN) as part of its production deployment for purposes of responding to events.

With respect to smart meter data, smart meter data (AMI) on energy usage interval data can be provided periodically and include service point usage data, such as: Service Point ID; Read Date; Read Time; and Usage Value (kWh). For customers, AMI data can be used to verify compliance by correlating power consumption at the customers' home service point with charging activity reported by the EV. Use of territory-wide AMI data can be used to determine the aggregate transformer load. Since the load manager 605 has access to reported charging behavior from EV data, non-flexible baseline load can be estimated by netting out reported EV charge load. This baseline load can be a useful input into the load management strategy.

The load manager can integrate information on low-voltage distribution system topology/architecture and assets, including meter-to-transformer mappings. Examples of such data can include transformer specifications, such as: transformer ID; transformer location (e.g., Latitude/Longitude); transformer rating (kVA); and install date (if available). Additional transformer model specifications (if available) can include: top oil rise; thermal capacity; meter-to-transformer links; meter ID; transformer ID; and active date (when meter-to-transformer link was established). This information provides system context for understanding EV charging impacts, allowing identification of current and future at-risk assets through predictive analysis. This information can be provided from the load manager 605 back to the utility 601 as an aid in investment planning decisions and to support more advanced load management strategies.

The load manager 605 can provide advanced EV load management through its integration with AMI data from smart meters 611 and data on the low-voltage distribution system 120 from the utility 601. This integration can allow the load manager 605 to provide the utility 601 with better understand charging behavior within residential load contexts, identify potential system hotspots, and refine future distribution planning and maintenance. In addition to informational benefits, the load manager 605 can use this information to support a more advanced load management strategy, running automated daily charging optimization to solve for both local and system peaks, as well as other important system criteria that the utility 601 may favor, such as emissions intensity of the energy used for charging, etc.

The techniques presented here can be applied more broadly to other loads on a local distribution system, but can be particularly relevant for EV load management as the rapid, clustered adoption of EVs may cause reliability challenges given the lack of real-time monitoring on the low-voltage parts of the grid, which often suffer from lack of data.

FIG. 8 is a table to illustrate components that can be used in embodiments of algorithms for the load manager's control software to schedule charging to minimize stress on constrained system components such as transformers, while enabling overall higher asset utilization. The first column of FIG. 8 lists categories of inputs, the second column gives some examples of these inputs, and the third column gives corresponding models.

A first category for the algorithm inputs is the non-EV system load modeling and forecasting for power grid 100, reflecting the demands on the grid other than the EV charging. Referring back to FIGS. 3-5, this corresponds to the usage throughout the day without the added on EV charging bars. The inputs for modeling and forecasting non-EV usage can include historical household usage, as can be provided by the utility 601, and weather data. These inputs can be used for modeling a load forecast.

The EV portion of load modeling and forecasting can be provided by the telematics data from the EVs' on-board control systems. Examples of this data can include, for each EV, the daily driving behavior, daily charging demand, plug-in frequency, and arrival and departure times. This data allows the load manager to forecast the charging demand for each EV, such as the amount of charging that the EV will likely require and when this can be done.

From the non-EV load forecast for the system combined with the EV charging demands and constraints, both read and simulated, the load manager 605 can perform charging optimization. As discussed in more detail below, the optimization model's objectives can include meeting the customer's charging requirements, peak reduction on the local distribution network 120, and also peak reduction on the larger systems of the power grid 100.

Figure 9:
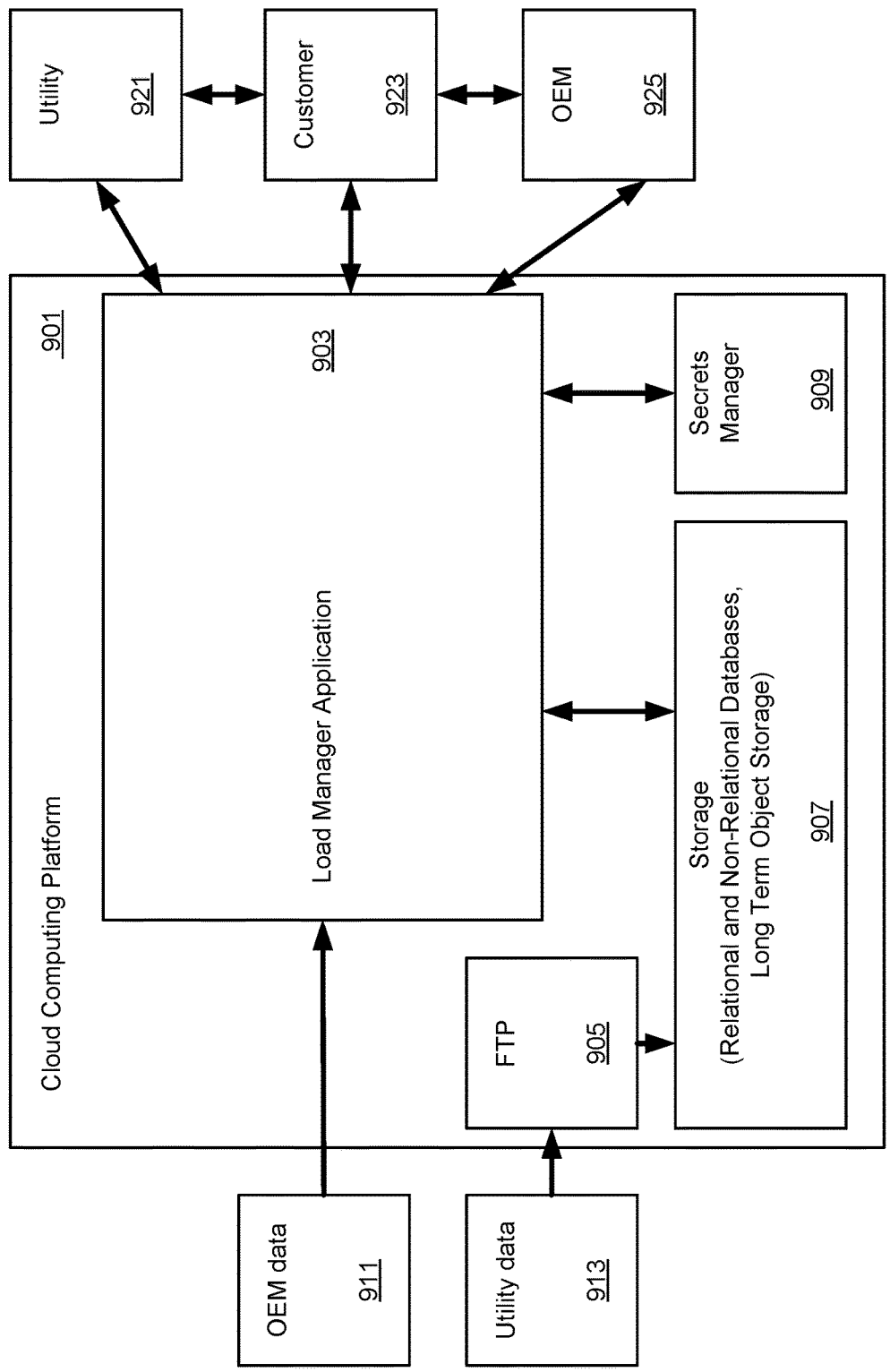
FIG. 9 is a schematic representation of an embodiment for the technology platform for implementation of the load manager.

FIG. 9 is a schematic representation of an embodiment for the technology platform for implementation of the load manager. In the embodiment of FIG. 9, the load manager is implemented in the cloud in a cloud computing platform 901, such as Amazon Web Services (AWS) or similar service. In other embodiments, some or all of the components described with respect to FIG. 9 can be implemented on servers or other computing devices operated by the load manager. Embodiments for the load manager platform can be EV manufacturer agnostic, enabling utilities to aggregate EV charging data and control across their entire distribution network. The platform is designed to collect data directly from the EVs and reconcile that information with the service account meter to determine a vehicle's load effect on an electrical distribution grid.

The cloud computing platform 901 in the embodiment of FIG. 9 includes the load manager application 903 along with memory for use of the load manager. The memory includes both a general memory storage 907, such as for a relational and non-relational databases and long term object storage, and also a "secrets manager" 909 for more confidential data (e.g., EV location data or user account data that contains sensitive personal information). Data from EV manufacturers, OEM data 911, on the EVs can be received by the load manager application 903 and utility data 913 can be stored, via file transfer protocol (FTP) block 905 to the storage 907. The customer (i.e., EV owner) 923 can exchange data with both the utility 921 and the EV OEM 925, with each of Utility 921, Customer 923, and OEM 925 in communication with the load application manager 903.

The customer, or user, 923 can authenticate with both the utility 921 and the manufacturer (OEM) 925 of their EV using, for example, an open standard authorization framework for token-based authorization on the internet, such as OAuth2. All access tokens from these authentication events can be stored securely in a secrets' manager 909. On a schedule (e.g., every 15 minutes) the load manager application 903 can download detailed EV data and store it in a non-relational database of storage 907 for easy retrieval. On an independent schedule, the utility can upload utility data 913, which can simultaneously be loaded into databases for analytics purposes and archived in long-term storage of storage 907. An analytics engine can use data from the OEM database 911 and utility database 913 and stores results in the storage 907, with older data eventually being archived into long-term object storage. A web portal and mobile application for the customer 923 can provide a user experience for viewing charging/energy consumption data and interacting with the managed charging process. Microservices can be deployed within the load manager application 903 for data reconciliation, charging optimization, and charge control through EV APIs.

Figure 10:
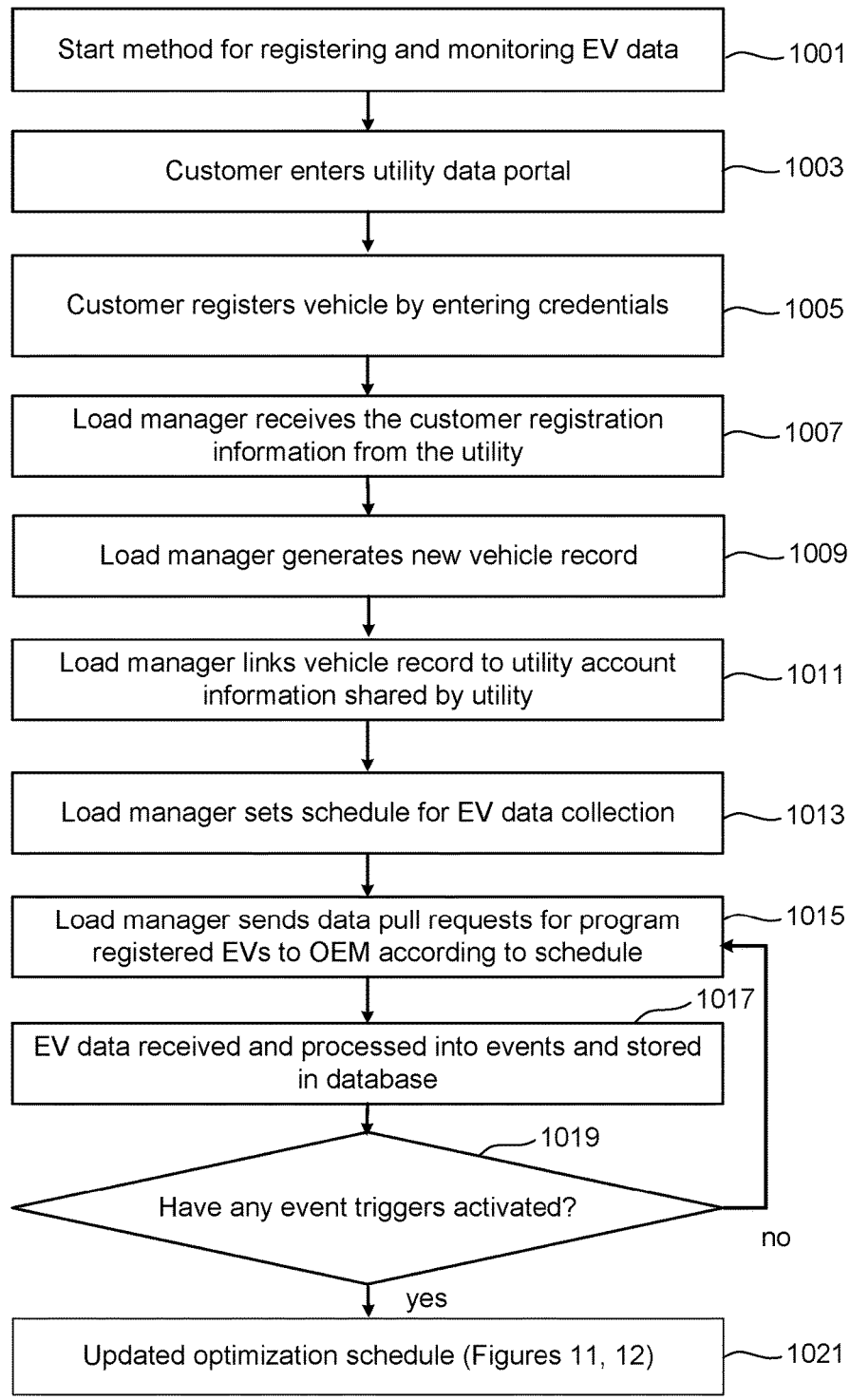
FIG. 10 is a flowchart of an embodiment for the registration and monitoring of EV data.

FIG. 10 is a flowchart of an embodiment for the registration and monitoring of EV data, starting at 1001. At step 1003, a customer enters a utility data portal, such as by logging in to the utility's website. The customers can be the owners of individual cars or other EVs, or could be the owner or operator of a fleet of EVs. The process can be performed by a customer that already has an EV that is charged at a given address, when a customer moves to a new address, or when the EV is initially acquired, such as at a dealership at time of purchase. The data portal can be specific to the customer's local utility or common to multiple utilities. When a customer moves, or changes charging location, the customer may need to register with a different utility or, in some embodiments, the customer's data can migrate to a new utility by updating of charging address. Once at the utility data portal, the registration of the EV or EVs by the customer is performed at step 1005 by entering of the vehicle credentials. For example, these credential can be provided by an EV's OEM mobile application.

At step 1007 the load manager receives the customer registration information entered at step 1005 from the utility. From this information, the load manager generates a new (or updated) record for the EV at step 1009 and, at step 1011, links the record to utility account information shared by the utility. The load manager can then set a schedule for data collection for the EV in order to set and update charging schedules at step 1013. Based on the information from steps 1003-1013, the EV can then be entered into the load managers scheduling process along with other registered EVs.

At step 1015 the load manager sends data pull requests for the registered EVs. This request can be sent to the OEMs of the registered EVs, although in some embodiments this information could alternately or additionally be provided to the load manager directly from some or all of the registered EVs. For example, in a cloud based implementation, the load manager's cloud software sends the data pull requests for all program-registered EVs to the corresponding OEMs cloud service provider according to a schedule. In step 1017, the EV data is received by the load manager, processed into events, and stored in a database.

From the data processed into events in step 1017, step 1019 determines whether any event triggers have activated. Event triggers are events that require action by the load managing system. Examples of triggering events can include: an EV starts charging; an EV's GPS data indicates that it has entered a pre-set GPS zone, such an area around the EV's home charging location; or an EV's state deviates too far from expectations (e.g., battery charge state higher or lower than estimated), among other triggers. If there are no event triggers activated at 1019, the flow loops back to 1015 to continue monitoring. If there are any event triggers activated, at step 1021 the load manager can update the optimization schedule at step 1021 before returning to monitoring. Examples of actions at step 1021 can include updating the grid system state and updating the charging optimization schedule. The updating of step 1021 is considered in more detail with respect to FIGS. 11 and 12.

Figure 11:
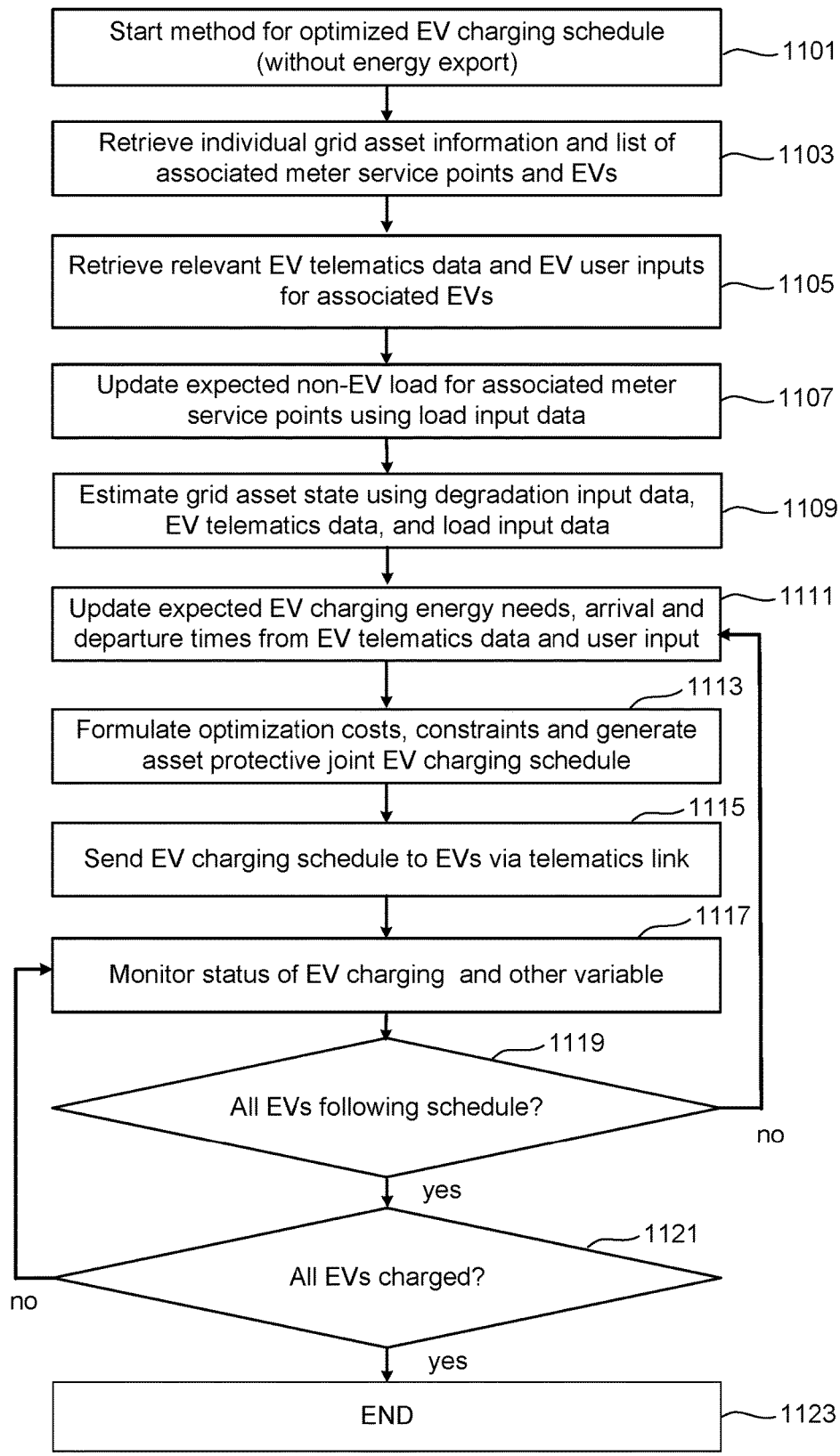
FIG. 11 is a flowchart for one embodiment of a method for optimizing EV charging schedule without energy export.

FIG. 11 is a flowchart for one embodiment of a method for optimizing EV charging schedules without energy export (i.e., without sending of power from a vehicle battery to the grid), starting at step 1101. At step 1103, the load manager 605 retrieves the grid asset information for the low voltage distribution networks 120, list of associated service points, and EVs. Grid asset information can refer to equipment of the low voltage distribution networks 120, such as information on step-down distribution transformers 121 like limits or costs related to throughput. This information can have previously been provided from the utility 601 to the load manager and be in storage 907 on the load manager's cloud computing platform 901, for example, or supplied or updated at this time.

At step 1105, the load manager 605 retrieves relevant EV telematics data and EV use inputs for the associated EVs. The EV telematics data are information that can be transmitted from onboard computers of the on-board control systems 615 of an EV 125 to a cloud computing service, for example, either directly to load manager 605 or by way of OEM 603. The EV telematics data can include information such as location, charging status, battery state of charge, voltage, current, power, as well as historical data or composite data, such as energy added over a charging session. This information can have previously been provided from the utility 601 to the load manager and be in storage 907 on the load manager's cloud computing platform 901, for example, or supplied or updated at this time from the EVs 125, OEM 603, or a combination of these. The EV user inputs are preferences provided by the owner of the EV, such as minimum charge levels or departure time. Depending on the embodiment, this information could be variously entered by the user by way of an app for this purpose, through the EV by way of the on-board control systems 615, or at the utility data portal (see step 1003 above).

At step 1107, the load manager 605 updates the non-EV load for associated meter service points using load input data. The load input data can use information such as account information for associated meter service points, utility meter data, and weather forecast data. Utility metering data refers to estimated or historical observed average power load or energy consumed for each meter service point. This information is frequently collected at regular intervals (e.g., hourly, 15 minutes, 5 minutes) and subsequently sends this information to the load manager in batches, such as by way of cloud computing services. The load manager then estimates grid asset state using degradation input data, the EV telematics data and non-EV load input data at step 1109, where degradation input data can include grid asset information, historical observed or estimated power loadings, and local weather data.

At step 1111, the load manager 605 updates the expected EV charging energy needs, arrival and departure times from the EV telematics data and EV user inputs, followed by formulating optimization cost and constraints, and generates an asset-protective joint EV charging schedule. In step 1113 the load manager formulates optimization costs and constraints, and generates asset-protective joint EV charging schedules. The optimization parameters and constraints depend on the embodiment and can include: cost, power rating of the asset, clean energy level percentages, customer battery levels needs, starting battery levels, power of charging, among other parameters. The weighting and integration of these parameters sets the constraints and cost function.

The load manager 605 sends out the EV charging schedules to the EVs 125 via telematics link with the EV's on-board control systems 615 at step 1115. The telematics link transmits the asset protective EV charging schedule that is the output of the optimization of step 1113. The optimization can include start/stop times for charging each of the associated EVs as chosen by an optimization algorithm includes grid asset information and vehicle telematics data, and can further include information such as price signals, emissions factors, and EV user inputs.

After sending out the schedules, next follows charging each of the EVs, based on the corresponding charging schedule. At step 1117 the load manager 605 monitors the status of EV charging, along with variables such as conditions on the local distribution networks 120. Step 1119 determines whether the EVs are actually following charging schedules and, if not, the flow loops back to step 1109 to recompute the schedule to account for the discrepancies. If all of the EVs are following their corresponding schedules at step 1119, the flow continues on to step 1121 to determine whether all of the EVs have been charged and, if not, the flow loops to step 1117 to continue monitoring. If all EVs are found to be charged at step 1121, the flow ends at 1123.

Figure 12:
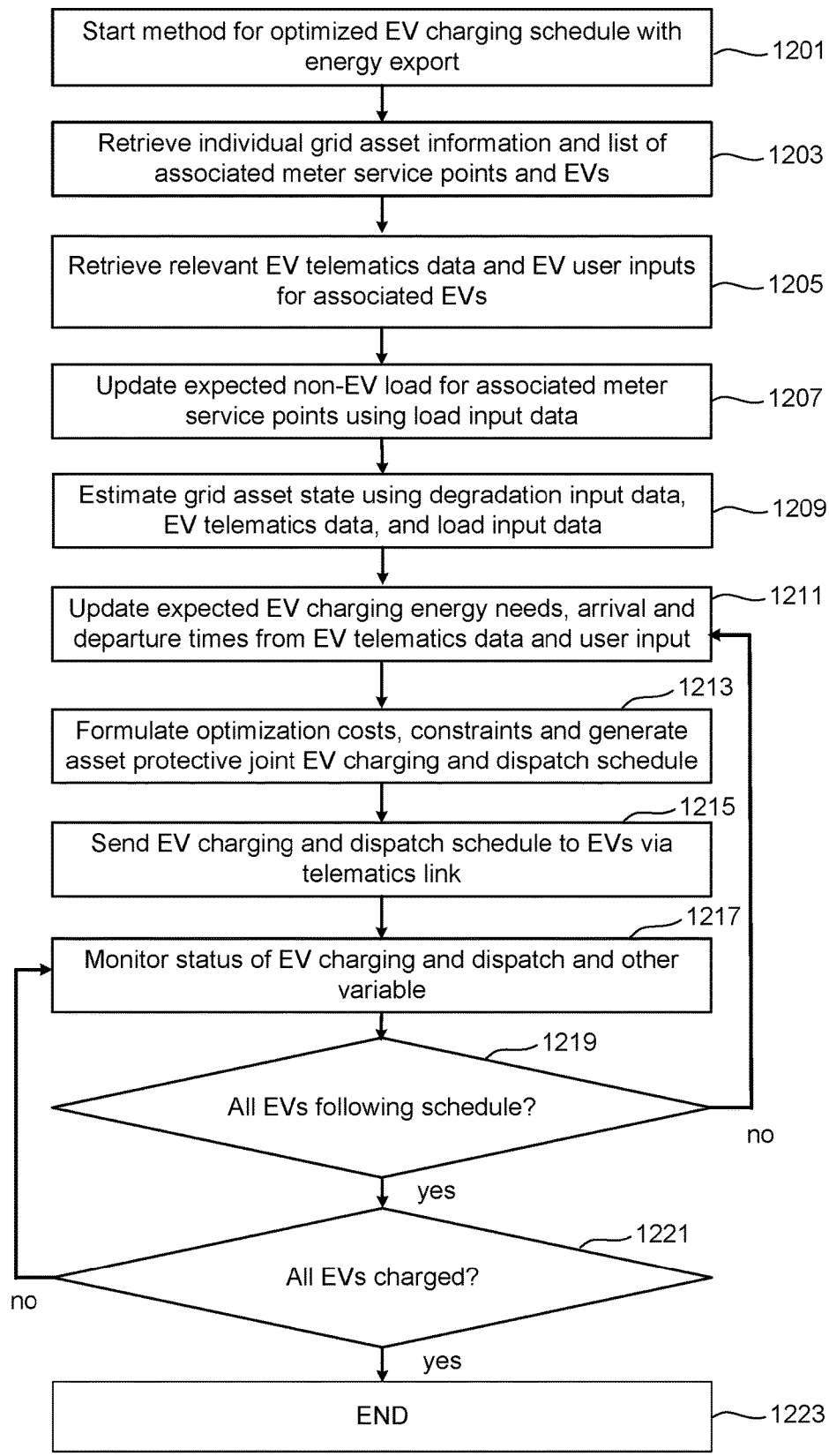
FIG. 12 is a is a flowchart for one embodiment of a method for optimizing EV charging schedule with energy export.

FIG. 12 is a is a flowchart for one embodiment of a method for optimizing EV charging schedules when energy export is included. In this context energy export refers to the sending of power from a vehicle battery to the grid (or V2G), so that energy flows can be in both directions, from the grid to the EV, as in FIG. 11, and also from the EV to the grid. The flow of FIG. 12 includes the timing and optimization of this two-way flow. The flow of an energy from an EV to the grid is also referred to as "dispatch". As before, there is the need to protect grid assets, such as transformer and feeders, but the incorporation of energy export adds flexibility (as power levels can go negative) and complexity (due to added costs and scheduling limits).

The flow of FIG. 12 starts at step 1201 and proceeds similarly to the flow of FIG. 11. At step 1203, the load manager 605 retrieves the grid asset information for the low voltage distribution networks 120, list of associated service points, and EVs. At step 1205, the load manager 605 retrieves relevant EV telematics data and EV use inputs for the associated EVs at step 1205. Relative to step 1105 of FIG. 11, in step 1205 the EV user inputs can now also include vehicle to grid participation variables. Steps 1205, 1207, 1209, and 1211 can correspond to steps 1105, 1107, 1109, and 1111 of FIG. 11.

At step 1213, the load manager 605 the load manager formulates optimization costs and constraints, and generates asset-protective joint EV charging schedules, when power flows from the grid to EV, similarly to step 1113, but now also generates dispatch schedules for when power flows from an EV to the grid. At step 1215 the load manager 605 sends out the EV charging schedules and dispatch schedules to the EVs 125 via telematics link with the EV's on-board control systems 615. The telematics link transmits the asset protective EV charging and dispatch schedule that is the output of the optimization of step 1113. The optimization can include start/stop times for charging or dispatch of each of the associated EVs as chosen by an optimization algorithm includes grid asset information and vehicle telematics data, and can further include information such as price signals, emissions factors, estimated dispatch costs (e.g., cost of marginal battery degradation) and EV user inputs.

After sending out the schedules, next follows charging each of the EVs, based on the corresponding charging schedule. The flow then continues to steps 1217, 1219, 1221 and 1223, which can be as described above with respect to steps 1117, 1119, 1121, and 1123 of FIG. 11, except now the monitoring of step 1217 is for the two-way flow between the grid and the EV, including EV dispatch as well as charging.

Figure 13:
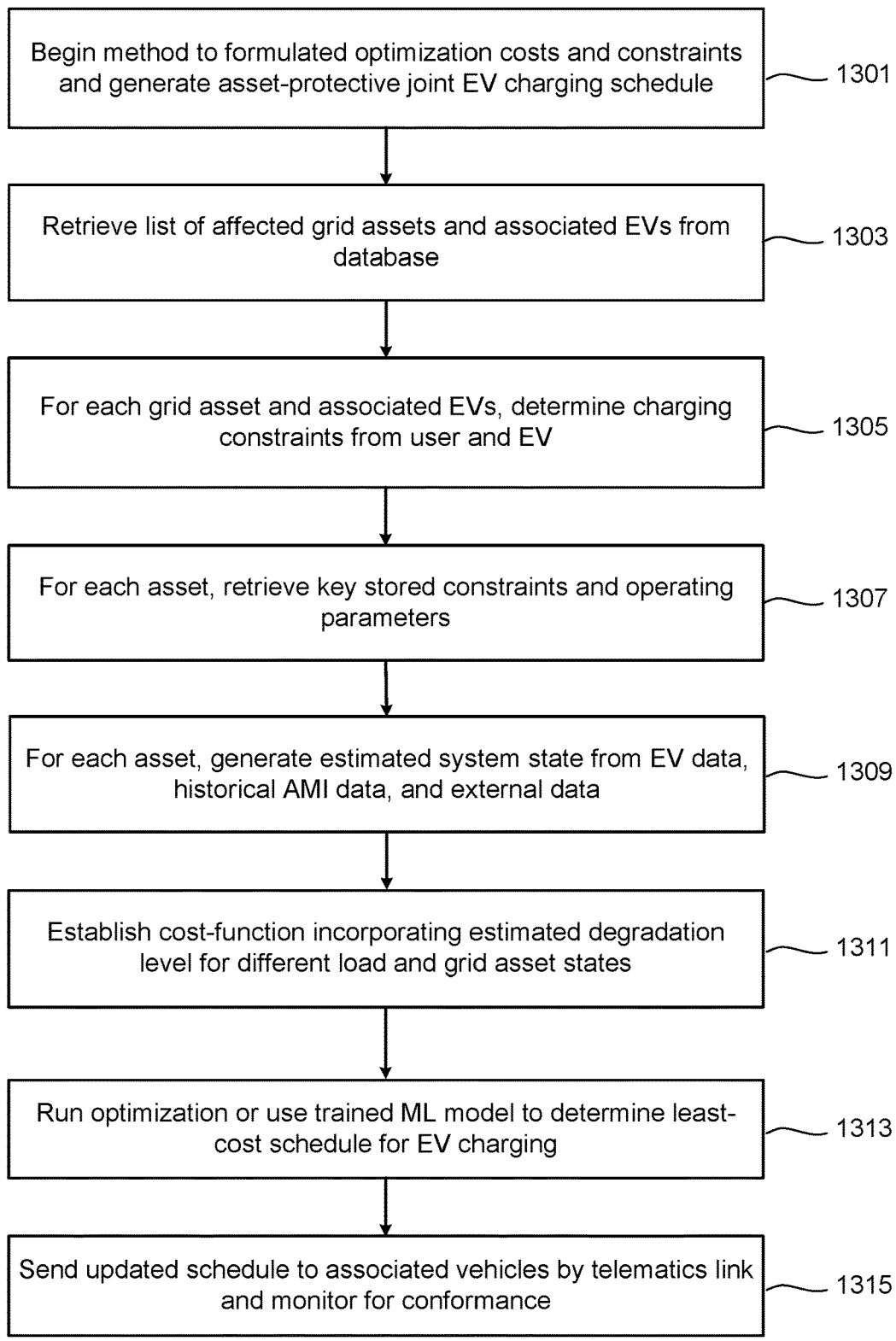
FIG. 13 illustrates an embodiment of a flowchart for a schedule optimization flow to generate asset-productive joint EV charging schedules.

FIG. 13 illustrates an embodiment of a flowchart for a schedule optimization flow to generate asset-productive joint EV charging schedules. The flow for a method to formulate optimization costs and constraints and generate joint EV charging schedules that can protect the assets of the distribution grid begins at 1301. At step 1303, the load manager 605 retrieves the list of affected grid assets and associated EVs from its database, such as storage 907. The load manager can also receive additional or updated grid asset information from the utility 601 and additional or updated EV information from OEM 603 or directly from EVs 125. For each grid asset, such as the low-voltage distribution transformers 121 or other parts of the local distribution network 120, and its associated EVs 125, the load manager application 903 determines charging constraints from user and EV data at step 1305.

At step 1307, the load manager 605 retrieves the key stored constraints and operating parameters from its database, such as storage 907, where the load manager can also receive additional or updated grid asset information from the utility 601. For each asset, the load manager application 903 can then generate estimated system state from vehicle data, historical AMI data, and external data (such as temperature or projected temperature) at step 1309.

In step 1311, the load manager application 903 establishes a cost function. The cost function can incorporate estimated levels of degradation for the local distribution grid 120 for different load levels and also local grid asset states for things such as estimated internal temperatures for assets, such as in a distribution transformers 121 under these load levels. The optimization for the cost function is ran at step 1313. This can be a convex or integer optimization, for example, or use a trained machine learning model. The optimization determines the least cost (in terms of the cost function) schedule for charging the associated EVs. At step 1315 the load manager 605 sends updated schedules to all of the associated vehicles. For example, this can be done by way of the corresponding OEMs 603 by way of a cloud telematics link to the on-board control systems 615 of the associated EVs and can include monitoring for conformance. In alternate embodiments, the updated schedule can be sent to the on-board control systems 615 of one or more of the associated EVs without going through the OEM 603.

Figure 14:
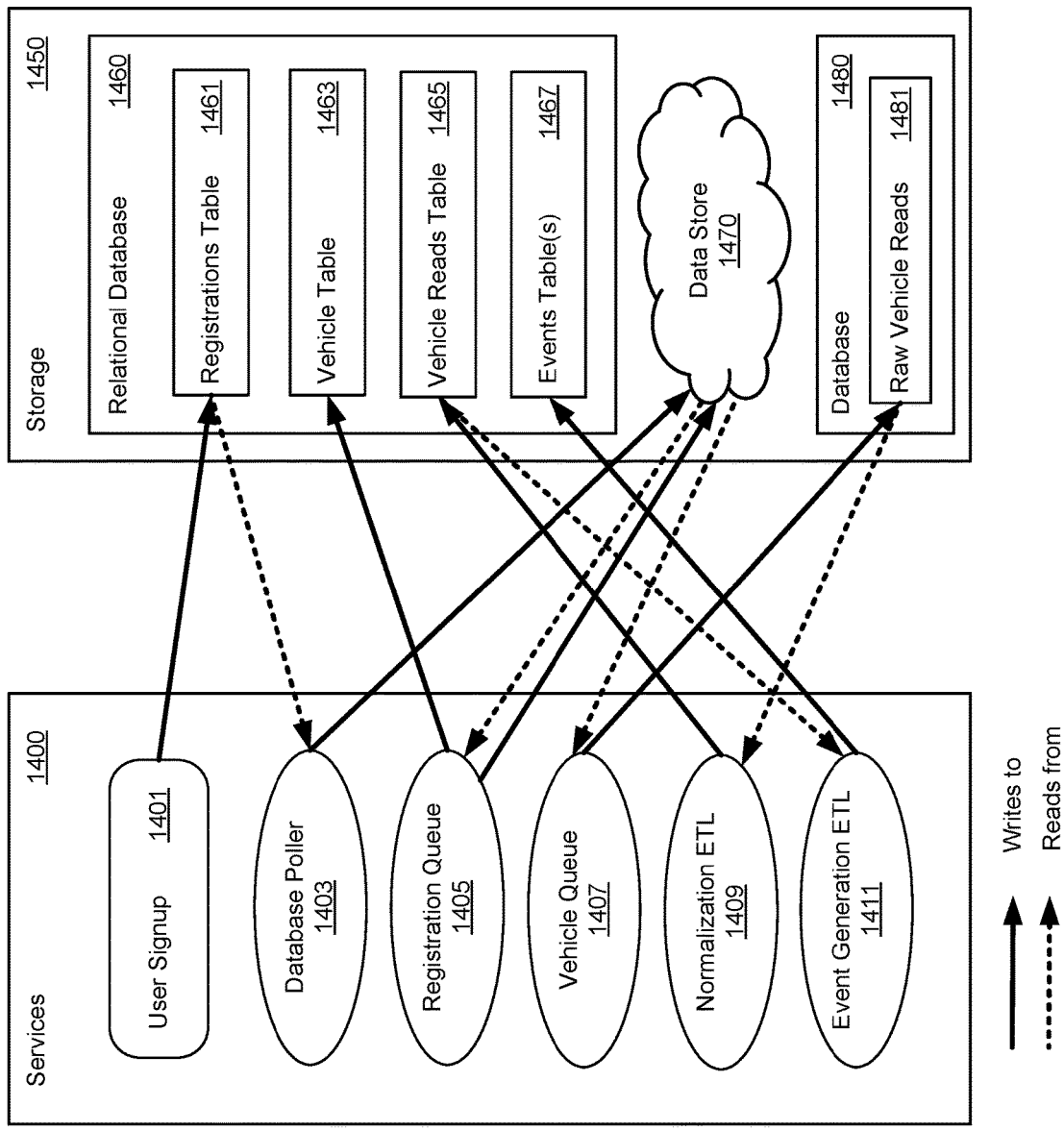
FIG. 14 is a schematic representation an embodiment for the dataflow between some of the services in the flows of FIGS. 10-13 and the load manager's storage.

FIG. 14 is a schematic representation an embodiment for the vehicle dataflow between some of the services 1400 in the flows of FIGS. 10-13 and storage 1450 used by the load manager's computing platform 901. Referring back to FIG. 9, the storage 1450 of FIG. 14 can corresponding to the storage 907 and can also include secrets manager 909 in some embodiments. Services 1400 can form part of the load manager application 903.

Storage 1450 is shown segmented into a relational database 1460, database 1480, and data store 1470 for more general data storage. The database 1480 can be used to store the raw vehicle data 1481 for the EVs as it is received by the load manager platform. The relational database 1460 can include relational databases such as an EV registration table 1461, a vehicle table 1463, a vehicle reads table 1465, and events table(s) 1467. Included within the services are user signup 1401, database poller 1403, registration queue 1405, vehicle queue 1407, normalization ETL (Extract, Transform, Load), and event generation ETL 1411. Examples of writes to storage elements from services are represented by solid arrows and reads from storage to services are represented broken lines.

On the services side, one embodiment of the user signup 1401 can be as described with respect to steps 1003 and 1005 of FIG. 10, where a customer registers an EV by way of a utility portal. The registration information can then be used generate records for the EVs, which can then be written into the registrations table 1461 as part of a relational database for such records, as at steps 1009 and 1011 of FIG. 10. From the registrations table 1461, the database poller 1403 can read out data from the registration table 1461 as requested by load manager application 903. The database poller 1403 can then write the accessed data from the relational database 1460 into the general data storage 1470, from where it can be read by the registration queue 1405 and the vehicle queue 1407.

The registration queue 1405 is a function in the load manager application 903 that can create queues between the various databases so that customer registration data are not lost are they are read and written between various databases. Data from the registration queue can be used to write back to the vehicle table 1463 in the relational database 1460 and can also write data back into the general data store 1470. Similarly, the vehicle queue 1407 is a function in the load manager application 903 that can create queues between the various databases so that EV charging data are not lost are they are read and written between various databases, such as when writing the EV charging data into the raw vehicle reads 1481 of database 1480.

The particulars of the data, and how these data are presented can vary depending on the EV. For example, different OEMs may provide different information and, even when the information is the same, it may be in a different formats. Even for same OEM, the information may vary between different vehicles as, for example, an electric truck might have different relevant data that are monitored than an electric car. To account for this, the normalization ETL 1409 can read out the raw vehicle reads 1481 from database 1480, normalize the data values between the various EV types, and the write the normalized data into the vehicle reads table 1465, as in step 1017 of FIG. 10.

Figure 15:
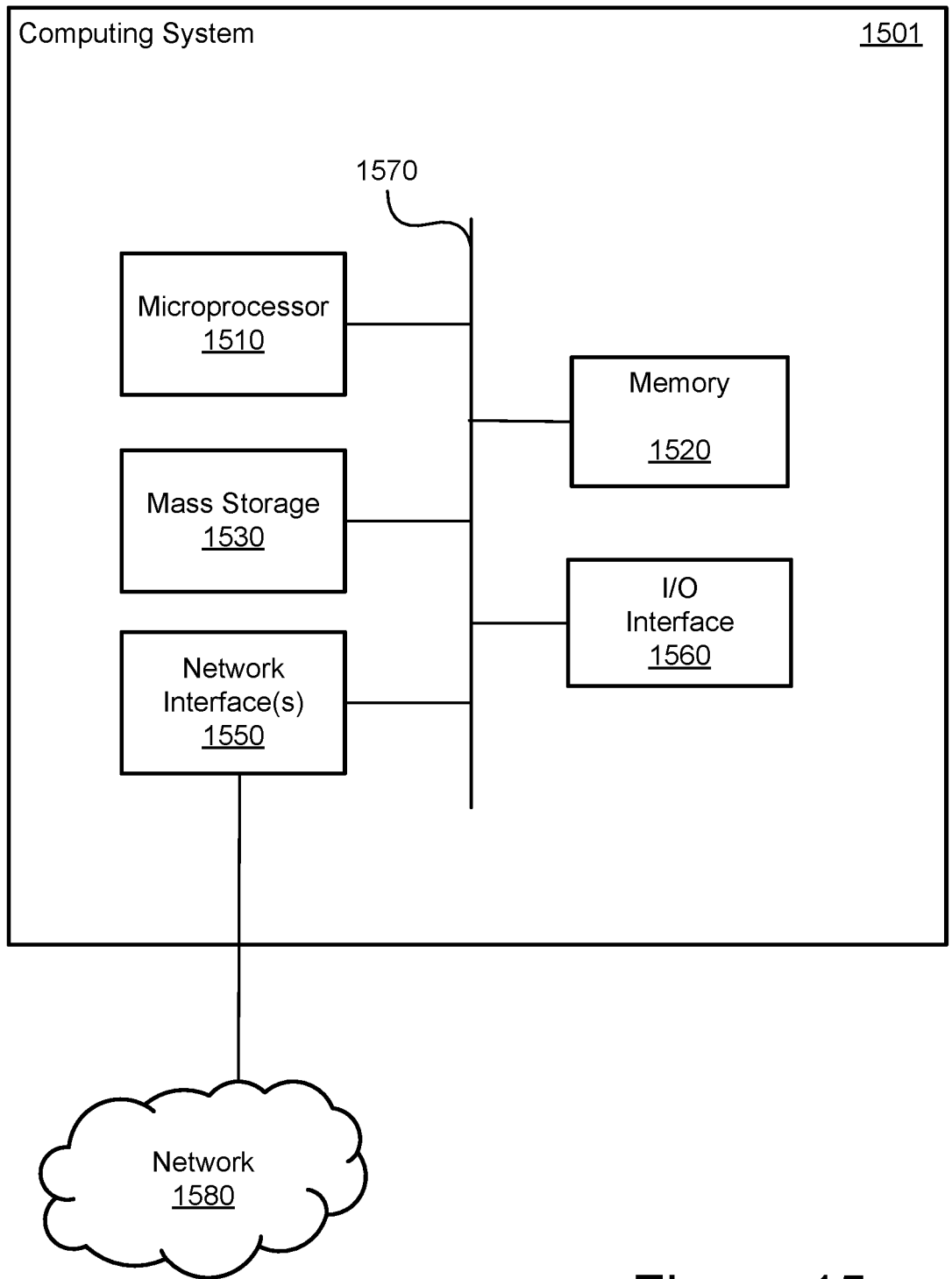
FIG. 15 is a high-level block diagram of a computing system that can be used to implement various embodiments of the load manager application of FIG. 9.

FIG. 15 is a high-level block diagram of a computing system 1501 that can be used to implement various embodiments of the load managing techniques described above. In one example, computing system 1501 is a network system. Specific devices may utilize all of the components shown, or only a subset of the components, and levels of integration may vary from device to device. Furthermore, a device may contain multiple instances of a component, such as multiple processing units, processors, memories, interfaces, etc. In one set of embodiments, the computing system 1501 can be implemented as a part of a cloud computing platform. Relative to FIGS. 9 and 14 above, the storage 907/1450 and secrets manager 909 can be part of memory 1520, mass storage 1530, or a combination of both; FTP block 905 can be included within the network interfaces 1550; and the load manager application 903, including the services 1400, can be performed within the central processing unit or units 1510.

The network system may comprise a computing system 1501 equipped with one or more input/output devices, such as network interfaces, storage interfaces, and the like. The computing system 1501 may include a central processing unit or units (CPU) 1510, a memory 1520, a mass storage device 1530, and an I/O interface 1560 connected to a bus 1570. The computing system 1501 is configured to connect to various input and output devices (keyboards, displays, etc.) through the I/O interface 1560. The bus 1570 may be one or more of any type of several bus architectures including a memory bus or memory controller, a peripheral bus or the like.

The CPU 1510 may comprise any type of electronic data processor. The CPU 1510 may be configured to implement any of the schemes described herein with respect to the pipelined operation of FIGS. 2-6, using any one or combination of steps described in the embodiments. The memory 1520 may comprise any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs.

The mass storage device 1530 may comprise any type of storage device configured to store data, programs, and other information and to make the data, programs, and other information accessible via the bus 1570. The mass storage device 1530 may comprise, for example, one or more of a solid-state drive, hard disk drive, a magnetic disk drive, an optical disk drive, or the like.

The computing system 1501 also includes one or more network interfaces 1550, which may comprise wired links, such as an Ethernet cable or the like, and/or wireless links to access nodes or one or more networks 1580. The network interface 1550 allows the computing system 1501 to communicate with remote units via the network 1580. For example, the network interface 1550 may provide wireless communication via one or more transmitters/transmit antennas and one or more receivers/receive antennas. In an embodiment, the computing system 1501 is coupled to a local-area network or a wide-area network for data processing and communications with remote devices, such as other processing units, the Internet, remote storage facilities, or the like. In one embodiment, the network interface 1550 may be used to receive and/or transmit interest packets and/or data packets in an ICN. In particular, the network interface 1550 can include the one or more interfaces by which the load manager application 903 can receive and transmit the various data and information described above, including charging schedules, EV telematics, and local distribution networks. Herein, the term "network interface" will be understood to include a port.

The components depicted in the computing system of FIG. 15 are those typically found in computing systems suitable for use with the technology described herein, and are intended to represent a broad category of such computer components that are well known in the art. Many different bus configurations, network platforms, and operating systems can be used.

According to a first set of aspects, a method includes receiving data on a low voltage distribution network and receiving telematics data from a plurality of electric vehicles (EVs). The method also includes determining, from the data on the low voltage distribution network and the telematics data from the plurality of EVs, a corresponding charging schedule for charging each of the plurality of EVs through the low voltage distribution network. The corresponding charging schedule is transmitted to each of the EVs.

In additional aspects, a system includes one or more interfaces and one or more processors connected to the one or more interfaces. The one or more interfaces are configured to: receive data on a low voltage distribution network; receive telematics data from a plurality of electric vehicles (EVs); and transmit to each of the EVs a corresponding charging schedule. The one or more processors are configured to determine, from the data on the low voltage distribution network and the telematics data from the plurality of EVs, the corresponding charging schedule for charging each of the plurality of EVs through the low voltage distribution network.

Further aspects include a method, comprising: receiving data on a low voltage distribution network from a utility managing the low voltage distribution network; receiving telematics data from a plurality of electric vehicles (EVs); determining, from the data on the low voltage distribution network and the telematics data from the plurality of EVs, a corresponding charging schedules for charging each of the plurality of EVs through the low voltage distribution network; transmitting to each of the EVs the corresponding charging schedules; monitoring usage of the low voltage distribution network by the EVs; and transmitting the data on the usage of the low voltage distribution network to the utility.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method, comprising:
   receiving data about a low voltage distribution network including a distribution transformer, the data on the low voltage distribution network including a power rating for the distribution transformer;
   receiving telematics data from each of a plurality of electric vehicles (EVs);
   determining a forecast of usage for each of the EVs;
   estimating a level of degradation of the low voltage distribution network from the forecast usage for each of the EVs and from the data on the low voltage distribution network; and
   determining from the telematics data, from the data on the low voltage distribution network, and from the estimated level of degradation of the low voltage distribution network a corresponding schedule for charging each of the plurality of EVs through the distribution transformer such that a total amount of power supplied through the distribution transformer when all of the plurality of EVs are charging according to the determined schedules does not exceed a limit for the low voltage distribution transformer.

2. The method of claim 1, wherein the data on the low voltage distribution network further includes an overload limit for the distribution transformer.

3. The method of claim 1, wherein estimating a level of degradation of the low voltage distribution network includes estimating a level of degradation for the distribution transformer.

4. The method of claim 1, wherein the low voltage distribution network further includes a substation supplying the distribution transformer,
   charging each of the plurality of EVs through the low voltage distribution network includes charging each of the plurality of EVs through the substation, and
   estimating the level of degradation of the low voltage distribution network includes estimating a level of degradation of the substation.

5. The method of claim 1, wherein the low voltage distribution network further includes a substation and one or more feeders through with the substation supplies the distribution transformer,
   charging each of the plurality of EVs through the low voltage distribution network includes charging each of the plurality of EVs through the one or more feeders, and
   estimating the level of degradation of the low voltage distribution network includes estimating a level of degradation of the one or more feeders.

6. The method of claim 1, wherein the data on the low voltage distribution network further includes estimated costs of an energy flow though the low voltage distribution network for charging the plurality of EVs according to the determined schedules.

7. The method of claim 1, wherein the data on the low voltage distribution network further includes price signals for charging the plurality of EVs according to the determined schedules.

8. The method of claim 1, further comprising:
estimating a level of battery degradation for each of the EVs from the forecast usage for each of the EVs, and wherein the corresponding schedule for charging each of the plurality of EVs through the distribution transformer is further based on the estimated level of battery degradation for each of the EVs.

9. The method of claim 1, further comprising:
providing an estimated level of degradation of the low voltage distribution network to a utility operating the low voltage distribution network.

10. The method of claim 1, further comprising:
providing the schedules for charging the plurality of EVs to a utility operating the low voltage distribution network.

11. The method of claim 1, wherein the data on the low voltage distribution network further includes clean energy percentages of an energy flow though the low voltage distribution network for charging the plurality of EVs according to the determined schedules.

12. The method of claim 1, wherein determining a forecast of usage for each of the EVs includes a forecast on when each of the EVs is forecast to be connected to be charged through the distribution transformer.

13. A method, comprising:
receiving data about a power grid operated by a power providing entity, including power rating data for one or more low voltage distribution networks of the power grid;
receiving telematics data from each of a plurality of electric vehicles (EVs);
determining a forecast of usage for each of the EVs;
estimating levels of degradation of the power grid from the forecast usage for each of the EVs and from the data about the power grid;
determining from the telematics data, from the power rating data for the one or more low voltage distribution networks, and from the estimated level of degradation of the power grid a corresponding schedule for charging each of the plurality of EVs through one of the low voltage distribution networks such that a total amount of power supplied through the low power distribution network when all of the plurality of EVs are charging according to the determined schedules does not exceed a limit for each of the low voltage distribution networks; and
providing the estimated level of degradation of the power grid to the power providing entity.

14. The method of claim 13, wherein the one or more low voltage distribution networks includes one or more transformers, the power rating data includes a power rating data for the one or more transformers, and the estimated level of degradation of the power grid includes a level of degradation for the one or more transformers.

15. The method of claim 14, wherein the power rating data includes an overload limit for each of the one or more transformers.

16. The method of claim 13, wherein the one or more low voltage distribution networks includes a substation, the power rating data includes a power rating data for the substation, and the estimated level of degradation of the power grid includes a level of degradation for the substation.

17. The method of claim 13, wherein the one or more low voltage distribution networks includes one or more transformers, a substation, and one or more feeders connecting the substation to the transformers,
the power rating data includes a power rating data for the one or more feeders, and
the estimated level of degradation of the power grid includes a level of degradation for the one or more feeders.

18. The method of claim 13, the method further comprising:
providing the generated schedules to the power providing entity.

19. The method of claim 18, further comprising:
receiving by the power providing entity of the generated schedules and of the estimated level of degradation of the power grid; and
managing of the power gird by the power providing entity of the grid using the generated schedules and the estimated level of degradation.

20. The method of claim 13, wherein determining a forecast of usage for each of the EVs includes a forecast on when each of the EVs is forecast to be connected to be charged through one of the low voltage distribution networks.

21. A system, comprising:
one or more interfaces configured to:
receive data about a low voltage distribution network including a distribution transformer, the data on the low voltage distribution network including a power rating for the distribution transformer; and
receive telematics data from each of a plurality of electric vehicles (EVs); and
one or more processors connected to the one or more interfaces and configured to:
determine a forecast of usage for each of the EVs, including a forecast on when each of the EVs is forecast to be connected to be charged through the distribution transformer;
estimate a level of degradation of the low voltage distribution network from the forecast usage for each of the EVs and from the data on the low voltage distribution network; and
determine from the telematics data, from the data on the low voltage distribution network, and from the estimated level of degradation of the low voltage distribution network a corresponding schedule for charging each of the plurality of EVs through the distribution transformer such that a total amount of power supplied through the distribution transformer when all of the plurality of EVs are charging according to the determined schedules does not exceed a limit for the low voltage distribution transformer.

22. The system of claim 21, wherein the one or more interfaces are further configured to:
providing the estimated level of degradation of the power grid to an operator of the low voltage distribution network.

* * * * *